(12) United States Patent
Tamura et al.

(10) Patent No.: US 12,075,241 B2
(45) Date of Patent: Aug. 27, 2024

(54) AMF NODE AND METHOD THEREOF

(71) Applicant: NEC Corporation, Tokyo (JP)

(72) Inventors: Toshiyuki Tamura, Tokyo (JP);
Tsuyoshi Takakura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 325 days.

(21) Appl. No.: 17/628,964

(22) PCT Filed: Dec. 18, 2020

(86) PCT No.: PCT/JP2020/047479
§ 371 (c)(1),
(2) Date: Jan. 21, 2022

(87) PCT Pub. No.: WO2021/132093
PCT Pub. Date: Jul. 1, 2021

(65) Prior Publication Data
US 2022/0264295 A1    Aug. 18, 2022

(30) Foreign Application Priority Data

Dec. 26, 2019  (JP) .................................. 2019-237391

(51) Int. Cl.
*H04W 12/06* (2021.01)
*H04W 76/30* (2018.01)
*H04W 84/04* (2009.01)

(52) U.S. Cl.
CPC ........... *H04W 12/06* (2013.01); *H04W 76/30* (2018.02); *H04W 84/042* (2013.01)

(58) Field of Classification Search
None
See application file for complete search history.

(56) References Cited

U.S. PATENT DOCUMENTS

| | | | |
|---|---|---|---|
| 2019/0182875 A1 | 6/2019 | Talebi Fard et al. | |
| 2021/0227392 A1* | 7/2021 | Zhu ........................ | H04W 12/66 |
| 2022/0295279 A1* | 9/2022 | Kuge ..................... | H04W 12/08 |
| 2023/0013720 A1* | 1/2023 | Gupta .................... | H04W 12/08 |

FOREIGN PATENT DOCUMENTS

| | | |
|---|---|---|
| CN | 110495214 A | 11/2019 |
| WO | 2019/160390 A1 | 8/2019 |

OTHER PUBLICATIONS

International Search Report for PCT Application No. PCT/JP2020/047479, mailed on Mar. 9, 2021.
3GPP TS 23.501 V16.2.0 (Sep. 2019) "3rd Generation Partnership Project: Technical Specification Group Services and System Aspects; System Architecture for the 5G System (5GS); Stage 2(Release 16)", Sep. 2019, pp. 1-382.

(Continued)

*Primary Examiner* — Kenneth B Wells
(74) *Attorney, Agent, or Firm* — Sughrue Mion, PLLC

(57) ABSTRACT

In response to a failure of a re-authentication and re-authorization procedure for a first network slice identifier currently allowed to a UE (1), the AMF node (2) initiates a release procedure to release a Protocol Data Unit (PDU) session associated with the first network slice identifier. This, for example, allows the AMF to appropriately manage a network slice configuration stored in the UE.

6 Claims, 20 Drawing Sheets

(56) References Cited

OTHER PUBLICATIONS

3GPP TS 23.502 V16.2.0 (Sep. 2019) "3rd Generation Partnership Project: Technical Specification Group Services and System Aspects; Procedures for the 5G System (5GS): Stage 2 (Release 16)", Sep. 2019, pp. 1-518.
3GPP TS 24.501 V16.2.0 (Sep. 2019) "3rd Generation Partnership Project: Technical Specification Group Core Network and Terminals; Non-Access-Stratum (NAS) protocol for 5G System (5GS); Stage 3 (Release 16)", Sep. 2019, pp. 1-601.
C1-199044, InterDigital et al., "Introduction of pending NSSAI for network slice-specific authentication and authorization", 3GPP TSG-CT WG1 Meeting #121, Reno (NV), USA, Nov. 11-15, 2019. pp. 1-40.
S2-1912488, China Mobile et al., "Service used for slice-specific re-authentication and revocation", 3GPP TSG-SA WG2 Meeting #136, Reno NV, USA, Nov. 18-22, 2019, pp. 1-3.
3GPP TS 24.501 V16.3.0 (Dec. 2019), pp. 1-644.
S3-194541, Nokia et al., "Draft for network slice specific authentication procedures", 3GPP TSG SA WG3 #97, Nov. 22, 2019, pp. 1-9.
S2-1812403, Motorola Mobility et al., "KI#3: Update to Solution 3.3 on (re-)authentication after failure/revocation", 3GPP TSG SA WG2 #129BIS, Nov. 20, 2018, pp. 1-4.
Extended European Search Report for EP Application No. EP20905332.1 dated on Aug. 18, 2022.
CN Office Action for CN Application No. 202080057781.1, mailed on Oct. 25, 2023 with English Translation.
JP Office Action for JP Application No. 2023-065476, mailed on Apr. 9, 2024 with English Translation.
NEC, "Preventing UE waiting for completion of NSSAA indefinitely—Atl1 NW timer", 3GPP TSG CT WG1 #121 C1-198368, Nov. 4, 2019.

\* cited by examiner

AMF NODE AND METHOD THEREOF

This application is a National Stage Entry of PCT/JP2020/047479 filed on Dec. 18, 2020, which claims priority from Japanese Patent Application 2019-237391 filed on Dec. 26, 2019, the contents of all of which are incorporated herein by reference, in their entirety.

TECHNICAL FIELD

The present disclosure relates to cellular networks, and in particular to management of network slices allowed to radio terminals.

BACKGROUND ART

The 5G system (5GS) connects a radio terminal (user equipment (UE)) to a Data Network (DN). In the 5G architecture, connectivity services between the UE and the DN are supported by one or more Protocol Data Unit (PDU) sessions (see, for example, Non-Patent Literature 1-3). A PDU session is an association, session, or connection between the UE and the DN. A PDU session is used to provide a PDU connectivity service (i.e., an exchange of PDUs between the UE and the DN). A PDU session is established between the UE and a User Plane Function (UPF) (i.e., PDU session anchor) to which the DN is connected. In terms of data transfer, a PDU session consists of a tunnel (N9 tunnel) in the 5G core network (5GC), a tunnel (N3 tunnel) between the 5GC and an Access Network (AN), and one or more radio bearers.

Non-Patent Literature 2 (3GPP TS 23.502) and Non-Patent Literature 3 (3GPP TS 24.501) specify a PDU session establishment procedure and a PDU session release procedure. More specifically, the PDU session establishment procedure is described in, for example, section 4.3.2.2 of Non-Patent Literature 1 and section 6.4.1 of 3 Non-Patent Literature 2. The PDU session release procedure is described in, for example, section 4.3.4.2 of Non-Patent Literature 1 and sections 6.3.3 and 6.4.3 of Non-Patent Literature 2.

The 5GS also supports network slicing (see, for example, Non-Patent Literature 1 to 3, especially Section 5.15 of Non-Patent Literature 1). Network slicing use Network Function Virtualization (NFV) and software-defined networking (SDN) technologies, thereby creating multiple virtualized logical networks on top of physical networks. Each virtualized logical network is called a network slice. A network slices provides specific network capabilities and network characteristics. In order to form a single network slice, a network slice instance (NSI) is defined as a set of network function (NF) instances, resources (e.g., computer processing resources, storage, and networking resources), and an access network (AN) (at least one of a Next Generation Radio Access Network (NG-RAN) and a Non-3GPP Interworking Function (N3IWF)).

A network slice is identified by an identifier known as Single Network Slice Selection Assistance Information (S-NSSAI). The S-NSSAI consists of a Slice/Service type (SST) and a Slice Differentiator (SD). The SST refers to the expected network slice behavior in terms of features and services. The SD is optional information and complements the SST to differentiate amongst multiple network slices of the same Slice/Service type.

An S-NSSAI can have standard values or non-standard values. Currently, standard SST values 1, 2, 3, and 4 are associated respectively with enhanced Mobile Broad Band (eMBB), Ultra Reliable and Low Latency Communication (URLLC), Massive Internet of Things (MIOT), and Vehicle to Everything (V2X) slice types. A non-standard value of an S-NSSAI with identifies a single network slice within a specific Public Land Mobile Network (PLMN). In other words, non-standard values are PLMN-specific values, and associated with the PLMN ID of a PLMN that has assigned them. Each S-NSSAI ensures network isolation by selecting a particular NSI. A NSI may be selected via different S-NSSAIs. An S-NSSAI may be associated with different NSIs. A network slice may be uniquely identified by an S-NSSAI.

There are two types of S-NSSAI, known as S-NSSAI and Mapped S-NSSAI. An S-NSSAI identifies a network slice served by a Public Land Mobile Network (PLMN) in which a UE is registered. A Mapped S-NSSAI may be an S-NSSAI of a Home PLMN (HPLMN) that is mapped to (associated with, or applicable to) an S-NSSAI that identifies a network slice of a roaming network when a UE is roaming, and also an S-NSSAI that is included in the subscription information of the UE. Thereafter, S-NSSAI and Mapped S-NSSAI may be collectively referred to as simply S-NSSAI in this specification.

Meanwhile, Network Slice Selection Assistance Information (NSSAI) means a set of S-NSSAIs. Accordingly, one or more S-NSSAIs can be included in one NSSAI. There are multiple types of NSSAI, known as Configured NSSAI, Requested NSSAI, Allowed NSSAI, Rejected NSSAI, and Pending NSSAI.

A Configured NSSAI includes one or more S-NNSAIs each applicable to one or more PLMNs. For example, The Configured NSSAI is configured by a Serving PLMN and is applied to the Serving PLMN. Alternatively, the Configured NSSAI may be a Default Configured NSSAI. The Default Configured NSSAI is configured by the Home PLMN (HPLMN) and applies to any PLMNs for which no specific Configured NSSAI has been provided. For example, a radio terminal (User Equipment (UE)) is provisioned with the Default Configured NSSAI from a Unified Data Management (UDM) of the HPLMN via an Access and Mobility Management Function (AMF).

A Requested NSSAI is signaled by a UE to a network in, for example, a registration procedure, allowing the network to determine a serving AMF, at least one network slice and at least one NSIs, for this UE.

An allowed NSSAI is provided to a UE by a Serving PLMN and indicates one or more S-NSSAIs that the UE can use in the current Registration Area of the Serving PLMN. The Allowed NSSAI is determined by an AMF of the Serving PLMN, for example, during a registration procedure. Accordingly, the Allowed NSSAI is signaled to the UE by the network (i.e., AMF) and stored in (non-volatile) memories of both the AMF and the UE.

A Rejected NSSAI includes one or more S-NSSAIs rejected by the current PLMN. The Rejected NSSAI may be referred to as rejected S-NSSAIs. A S-NSSAI is rejected throughout the current PLMN or rejected in the current registration area. If an AMF rejects any of one or more S-NSSAIs included in the Requested NSSAI, for example, in a registration procedure of a UE, it includes them in the Rejected NSSAI. The Rejected NSSAI is signaled to the UE by the network (i.e., AMF) and stored in (non-volatile) memories of both the AMF and the UE.

A Pending NSSAI is newly agreed upon in the 3rd Generation Partnership Project (3GPP) (see Non-Patent Literature 4). A Pending NSSAI indicates one or more S-NSSAIs for which Network Slice-Specific Authentication and Authorization (NSSAA)) is pending. A Serving PLMN shall perform NSSAA for S-NSSAIs of the HPLMN which are subject to NSSAA based on subscription information. In order to perform NSSAA, an AMF invokes an Extensible Authentication Protocol (EAP)-based authorization procedure. The EAP-based authentication procedure takes a relatively long time to obtain its outcome. Accordingly, whilst the AMF determines an Allowed NSSAI as described above during a registration procedure of a UE, it does not include S-NSSAIs subject to NSSAA in the Allowed NSSAI, but instead includes them in the Pending NSSAI. The Pending NSSAI is signaled to the UE by the network (i.e., AMF) and stored in (non-volatile) memories of both the AMF and the UE.

An AMF manages a UE context for a UE in Registration Management (RM)-REGISTERED state. The UE context may be referred to as, but is not limited to, a Mobility Management (MM) context. The UE context may include one or more of the Allowed NSSAI, Rejected NSSAI, and Pending NSSAI described above. On the other hand, the UE manages a UE NSSAI configuration, which includes the Configured NSSAI, Allowed NSSAI, Rejected NSSAI, and Pending NSSAI described above. The UE NSSAI configuration is stored in a non-volatile memory in the UE (Mobile Equipment (ME) except Universal Subscriber Identity Module (USIM)). The memory or memory area where the UE NSSAI configuration is stored is referred to as NSSAI storage.

Section 5.15.10 of Non-Patent Literature 1 (3GPP TS 23.501) and Section 4.2.9 of Non-Patent Literature 2 (3GPP TS 23.502) specify the Network Slice-Specific Authentication and Authorization (NSSAA). More specifically, section 5.15.10 of Non-Patent Literature 1 and section 4.2.9.2 of Non-Patent Literature 2 describe the NSSAA. Section 5.15.10 of Non-Patent Literature 1 and Section 4.2.9.3 of Non-Patent Literature 2 describe the re-authentication and re-authorization triggered by an Authentication, Authorization and Accounting (AAA) server (AAA-S). Section 5.15.10 of Non-Patent Literature 1 and Section 4.2.9.4 of Non-Patent Literature 2 describe the revocation of Slice-Specific Authorization triggered by an AAA server. In addition, Non-Patent Literature 5 describes a proposed amendment to the revocation of Slice-Specific Authorization as specified in section 4.2.9.4 of Non-Patent Literature 2.

CITATION LIST

Non Patent Literature

[Non-Patent Literature 1] 3GPP TS 23.501 V16.2.0 (2019-09) "3rd Generation Partnership Project; Technical Specification Group Services and System Aspects; System Architecture for the 5G System (5GS); Stage 2 (Release 16)", September 2019

[Non-Patent Literature 2] 3GPP TS 23.502 V16.2.0 (2019-09) "3rd Generation Partnership Project; Technical Specification Group Services and System Aspects; Procedures for the 5G System (5GS); Stage 2 (Release 16)", September 2019

[Non-Patent Literature 3] 3GPP TS 24.501 V16.2.0 (2019-09) "3rd Generation Partnership Project; Technical Specification Group Core Network and Terminals; Non-Access-Stratum (NAS) protocol for 5G System (5GS); Stage 3 (Release 16)", September 2019

[Non-Patent Literature 4] InterDigital, ZTE, vivo, NEC, "Introduction of pending NSSAI for network slice-specific authentication and authorization", C1-199044, 3GPP TSG-CT WG1 Meeting #121, Reno (Nev.), USA, 11-15 Nov. 2019

[Non-Patent Literature 5] China Mobile, Nokia, Ericsson, Telecom Italia, "Service used for slice-specific re-authentication and revocation", S2-1912488, 3GPP TSG-SA WG2 Meeting #136, Reno NV, USA, 18-22 Nov. 2019

SUMMARY OF INVENTION

Technical Problem

The AMF may perform Network Slice-Specific Authentication and Authorization (NSSAA) again on one or more currently allowed S-NSSAIs of the UE (See, for example, section 4.2.9 of Non-Patent Literature 2). More specifically, if the Authentication, Authorization and Accounting (AAA) server triggers re-authentication of one or more currently allowed S-NSSAIs, then the AMF triggers the initiation of NSSAA for these S-NSSAIs. In addition, the AMF may determine, based on changes in the UE's subscription information, that reauthentication is required for one or more currently allowed S-NSSAIs of that UE. Furthermore, when the AMF receives a Registration Request message for Mobility Registration Update or Periodic Registration Update from the UE, it may determine, for example based on operator policy, that re-authentication is required for one or more currently allowed S-NSSAIs. In addition, as well as these conditions, the AMF may determine that re-authentication is required for one or more currently allowed S-NSSAIs, for example based on operator policy. In these cases, the AMF triggers the initiation of NSSAA for S-NSSAIs that need to be reauthenticated.

The inventors have studied and found various issues regarding a reauthentication and re-authorization procedure for an S-NSSAI currently allowed to a UE. First, it is not clear how an AMF handles a UE NSSAI configuration (NSSAI storage) stored in a UE when triggering the initiation of a re-authentication and re-authorization procedure (i.e., NSSAA) for a particular S-NSSAI currently allowed to the UE. More specifically, it is not clear whether the AMF should (a) continue to have the particular S-NSSAI to be stored in the Allowed NSSAI of the UE NSSAI configuration. In addition, the current 3GPP specifications do not specify the process of moving an S-NSSAI from the Allowed NSSAI to the Pending NSSAI within the UE NSSAI configuration, i.e. deleting the S-NSSAI stored in the Allowed NSSAI in the UE NSSAI configuration and storing it in the Pending NSSAI in the UE NSSAI configuration.

Second, for example, while the re-authentication and re-authorization procedure for an S-NSSAI currently allowed to a UE is in progress, the UE may initiate a new PDU session establishment procedure associated with that S-NSSAI. In this case, there may be a conflict (or collision) between the re-authentication and re-authorization procedures for the S-NSSAI and the PDU session establishment procedure.

Third, if the re-authentication and re-authorization procedure for an S-NSSAI fails, it is not clear how the network (e.g., AMF and SMF) will handle existing PDU sessions associated with that S-NSSAI.

Fourth, if the re-authentication and re-authorization procedure for the S-NSSAI fails, it is not clear how the network (e.g., AMF and SMF) will handle an ongoing PDU session establishment procedure associated with that S-NSSAI.

One of the objects to be attained by embodiments disclosed herein is to provide apparatuses, methods, and programs that contribute to allowing an AMF to appropriately manage a network slice configuration (e.g., UE NSSAI configuration) stored in a UE. It should be noted that this object is merely one of the objects to be attained by the embodiments disclosed herein. Other objects or problems and novel features will be made apparent from the following description and the accompanying drawings.

Solution to Problem

In a first aspect, an AMF includes at least one memory and at least one processor coupled to the at least one memory. The at least one processor is configured to send to a UE a first Non-Access Stratum (NAS) message for causing the UE to update a UE configuration. The UE configuration is stored by the UE and includes a) a set of allowed network slice identifiers indicating one or more network slice identifiers currently allowed to the UE, and b) a set of pending network slice identifiers indicating one or more network slice identifiers for which Network Slice-Specific Authentication and Authorization (NSSAA) procedures are pending. The first NAS message causes the UE to remove a first network slice identifier currently allowed to the UE from the set of allowed network slice identifiers and store the first network slice identifier in the set of pending network slice identifiers.

In a second aspect, a method in an AMF includes, when triggering initiation of a re-authentication and re-authorization procedure for a first network slice identifier currently allowed to a UE, sending to the UE a first Non-Access Stratum (NAS) message for causing the UE to update a UE configuration. The UE configuration is stored by the UE and includes a) a set of allowed network slice identifiers indicating one or more network slice identifiers currently allowed to the UE, and b) a set of pending network slice identifiers indicating one or more network slice identifiers for which Network Slice-Specific Authentication and Authorization (NSSAA) procedures are pending. The first NAS message causes the UE to remove a first network slice identifier currently allowed to the UE from the set of allowed network slice identifiers and store the first network slice identifier in the set of pending network slice identifiers. The first NAS message causes the UE to remove a first network slice identifier currently allowed to the UE from the set of allowed network slice identifiers and store the first network slice identifier in the set of pending network slice identifiers.

In a third aspect, a UE includes at least one memory and at least one processor coupled to the at least one memory. The at least one processor is configured to manage a UE configuration. The UE configuration includes a) a set of allowed network slice identifiers indicating one or more network slice identifiers currently allowed to the UE, and b) a set of pending network slice identifiers indicating one or more network slice identifiers for which Network Slice-Specific Authentication and Authorization (NSSAA) procedures are pending. The at least one processor is further configured to remove a first network slice identifier currently allowed to the UE from the set of allowed network slice identifiers and store the first network slice identifier in the set of pending network slice identifiers, in response to receiving a first Non-Access Stratum (NAS) message from an AMF.

In a fourth aspect, a method in a UE includes the following steps:

managing a UE configuration, where the UE configuration includes a) a set of allowed network slice identifiers indicating one or more network slice identifiers currently allowed to the UE, and b) a set of pending network slice identifiers indicating one or more network slice identifiers for which Network Slice-Specific Authentication and Authorization (NSSAA) procedures are pending; and removing a first network slice identifier currently allowed to the UE from the set of allowed network slice identifiers and storing the first network slice identifier in the set of pending network slice identifiers, in response to receiving a first Non-Access Stratum (NAS) message from an Access and Mobility Management Function (AMF).

In a fifth aspect, a program includes instructions (software codes) that, when loaded into a computer, cause the computer to perform the method according to the above-described second or fourth aspect.

Advantageous Effects of Invention

According to the above-described aspects, it is possible to provide apparatuses, methods, and programs that contribute to allowing an AMF to appropriately manage a network slice configuration (e.g., UE NSSAI configuration) stored in a UE.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions of the embodiments mainly focus on the 3rd Generation Partnership Project (3GPP) fifth generation mobile communication system (5G system (5GS)). However, these embodiments may be applied to other cellular communication systems that support network slicing similar to that of the 5GS.

First Embodiment

Figure 1:
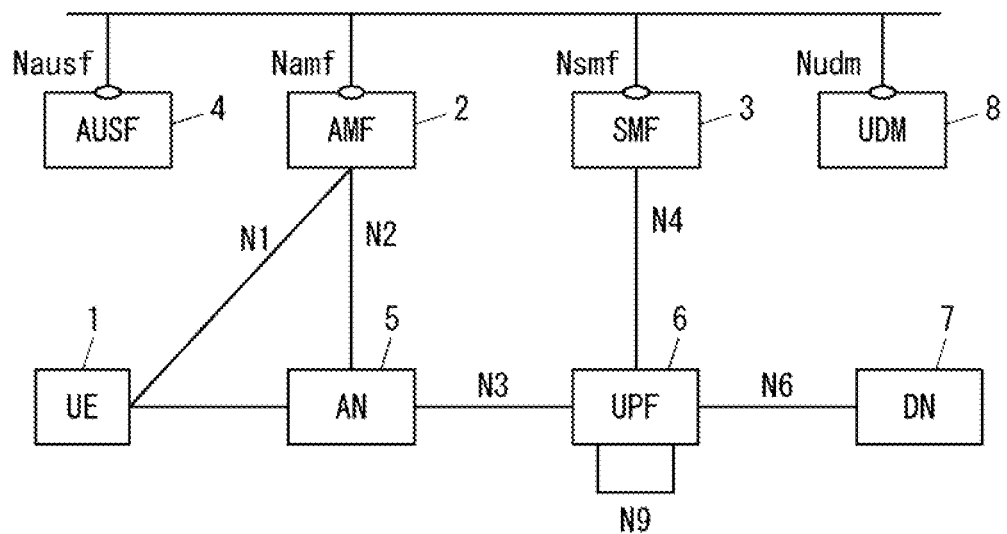
FIG. 1 is a diagram showing a configuration example of a cellular network according to an embodiment.

FIG. 1 shows a configuration example of a cellular network (i.e., 5GS) according to the present embodiment. Each of the elements shown in FIG. 1 is a network function and provides an interface as defined by the 3rd Generation Partnership Project (3GPP). Each of the elements (network functions) shown in FIG. 1 can be implemented, for example, as a network element on dedicated hardware, as a software instance running on dedicated hardware, or as a virtual function instantiated on an application platform.

The cellular network shown in FIG. 1 may be provided by a Mobile Network Operator (MNO), or it may be a Non-Public Network (NPN) provided by a non-MNO. If the cellular network shown in FIG. 1 is an NPN, it may be an independent network, represented as a Stand-alone Non-Public Network (SNPN), or it may be an NPN linked to an MNO network, represented as a public network integrated NPN.

A radio terminal (i.e., UE) 1 uses 5G connectivity services and communicates with a data network (DN) 7. More specifically, the UE 1 is connected to an access network (i.e., 5G Access Network (SGAN)) 5 and communicates with the DN 7 via a User Plane Function (UPF) 6 in a core network (i.e., 5G core network (5GC)). The AN 5 may include a Next Generation Radio Access Network (NG-RAN) or a non-3GPP AN, or both. The non-3GPP AN may be a network that handles wireless LAN (WiFi) communications or a network that handles wired communications, referred to as a Wireline 5G Access Network (W-SGAN). The UPF 6 may include multiple UPFs that are interconnected.

In the 5G architecture, the connectivity service between the UE 1 and the DN 7 is supported by one or more Protocol Data Unit (PDU) sessions. A PDU session is an association, session, or connection between the UE 1 and the DN 7. A PDU session is used to provide a PDU connectivity service (i.e., an exchange of PDUs between the UE 1 and the DN 7). The UE 1 establishes one or more PDU sessions between the UE 1 and the UPF 6 (i.e., the PDU session anchor) to which the DN 7 is connected. In terms of data transfer, a PDU session consists of a tunnel (N9 tunnel) in the 5GC, a tunnel (N3 tunnel) between the 5GC and the AN 5 and one or more radio bearers. Although not shown in FIG. 1, the UE 1 may establish multiple PDU sessions with multiple UPFs (PDU session anchors) 6 in order to concurrently access multiple DNs 7.

The AMF 2 is one of the network functions in the 5GC Control Plane. The AMF 2 provides the termination of a RAN Control Plane (CP) interface (i.e., N2 interface). The AMF 2 terminates a single signalling connection (i.e., N1 NAS signalling connection) with the UE 1 and provides registration management, connection management, and mobility management. The AMF 2 provides NF services to NF consumers (e.g., other AMFs, Session Management Function (SMF) 3, and Authentication Server Function (AUSF) 4) on a service-based interface (i.e., Namf interface). The NF services provided by the AMF 2 include a communication service (Namf_Communication). The communication service allows NF consumers (e.g., SMF 3) to communicate with the UE 1 or AN 5 via the AMF 2.

The SMF 3 is one of the network functions in the 5GC Control Plane. The SMF 3 manages PDU sessions. The SMF 3 sends and receives SM signalling messages (NAS-SM messages, N1 SM messages) to and from the Non-Access-Stratum (NAS) Session Management (SM) layer of the UE 1 via communication services provided by the AMF 2. The SMF 3 provides NF services on a service-based interface (i.e., Nsmf interface) to NF consumers (e.g., AMF 2, other SMFs). The NF services provided by the SMF 3 include a PDU session management service (Nsmf_PDUSession), which allows the NF consumer (e.g., AMF 2) to handle PDU sessions. The SMF 3 may be an Intermediate SMF (I-SMF). The I-SMF is inserted between the AMF 2 and an original SMF 3 as needed when the UPF 6 belongs to a different SMF service area and cannot be controlled by the original SMF.

The AUSF 4 is one of the network functions in the 5GC Control Plane. The AUSF 4 provides NF services on a service based interface (i.e., Nausf interface) to NF consumers (e.g., AMF 2, UDM 8). The NF services provided by the AUSF 4 include a UE authentication service (e.g., Nausf_UEAuthentication and Nausf_NSSAA_Authenticate). The Nausf_UEAuthentication service provides UE authentication and related key information (keying material) to the NF consumer (i.e., AMF). More specifically, the AUSF 4 cooperates with the UDM 8 and Authentication credential Repository and Processing Function (ARPF) to perform authentication using one of the two authentication methods (i.e., 5G-Authentication and Key Agreement (AKA) and EAP-based authentication) supported by the 5GS. After performing the authentication, the AUSF 4 replies to the AMF 2 with the authentication result and, if successful, a master key. The master key is used by the AMF 2 to derive NAS security keys and other security key(s). For UE authentication, the AUSF 4 works closely with the UDM 8. The Nausf_NSSAA_Authenticate service provides the NF consumer (e.g., AMF 2) with a Network Slice-Specific Authentication and Authorization service between the UE 1 and an AAA server via the AUSF 4.

The UDM 8 is one of the network functions in the 5GC Control Plane. The UDM 8 provides access to a database (i.e., User Data Repository (UDR)) storing subscriber data (subscription information). The UDM 8 provides NF services on a service-based interface (i.e., Nudm interface) to NF consumers (e.g., AMF 2, AUSF 4, SMF 3). The NF services provided by the UDM 8 include a subscriber data management service, which allows the NF consumer (e.g., AMF) to retrieve subscriber data and provides updated subscriber data to the NF consumer.

The configuration example in FIG. 1 shows only typical NFs for convenience of explanation. The cellular network according to this embodiment may include other NFs not shown in FIG. 1, such as Network Slice Selection Function (NSSF) and Policy Control Function (PCF).

Figure 2:
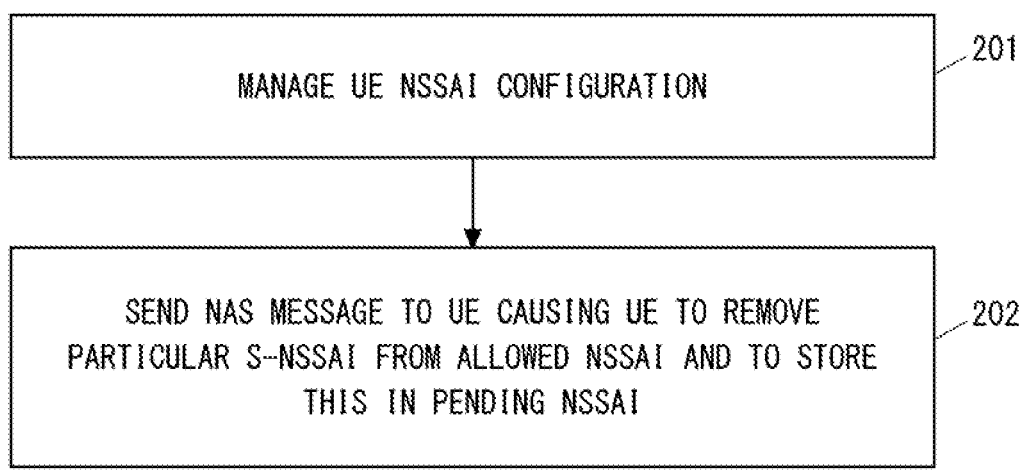
FIG. 2 is a flowchart showing an example of operation of an AMF according to an embodiment.

FIG. 2 is a flowchart showing an example of the operation of the AMF 2. In step 201, the AMF 2 manages a UE NSSAI configuration (NSSAI storage) stored in the UE 1. Specifically, AMF 2 creates an Allowed NSSAI, a Rejected NSSAI, or a Pending NSSAI, or any combination of these, to be stored in the UE NSSAI configuration (NSSAI storage) of the UE 1, and provides it to the UE 1 via a NAS message. The AMF 2 also manages a UE context for the UE 1 that is in RM-REGISTERED state. This UE context includes an Allowed NSSAI, a Rejected NSSAI or a Pending NSSAI, or any combination of these.

In step 202, the AMF 2 sends a NAS message to the UE 1 causing the UE 1 to remove a particular S-NSSAI from the Allowed NSSAI in the UE NSSAI configuration and to store this in the Pending NSSAI in the UE NSSAI configuration. In other words, the AMF 2 may send to the UE 1 a NAS message causing the UE 1 to move that particular S-NSSAI from the Allowed NSSAI to the Pending NSSAI in the UE NSSAI configuration. Specifically, the AMF 2 includes the particular S-NSSAI in a Pending NSSAI IE and provides this to the UE 1 via the NAS message. In another example, the AMF 2 may create both an updated Allowed NSSAI from which the particular S-NSSAI has been removed, and an updated Pending NSSAI to which the particular S-NSSAI has been added, and provide these to the UE 1 via the NAS message. The NAS message may be, for example, a UE Configuration Update Command message. In response to the reception of the NAS message, the UE 1 updates its UE NSSAI configuration (NSSAI storage) stored in a (non-volatile) memory of the UE 1. Specifically, if the particular S-NSSAI, which is included in the Pending NSSAI IE received via the NAS message, is included in the Allowed NSSAI in the UE NSSAI storage, the UE 1 removes it from the Allowed NSSAI and stores it in the Pending NSSAI. In other words, the UE 1 may move the particular S-NSSAI from the Allowed NSSAI to the Pending NSSAI in the UE NSSAI configuration (NSSAI storage).

The UE NSSAI configuration (NSSAI storage) may include status information indicating permission status by NSSAA for each of the S-NSSAIs included in one or more of the Allowed NSSAI, Rejected NSSAI, and Pending NSSAI. The status information for the S-NSSAIs may indicate whether the current NSSAA permission for each S-NSSAI is still available (allowed to use, or permitted) or unavailable (not allowed to use, or not permitted) during re-authentication and re-authorization.

In some implementations, the UE 1 may manage the status information with respect to the S-NSSAIs included in the Allowed NSSAI. In other words, the status information may be associated with the Allowed NSSAI. In other implementations, the UE 1 may manage the current permission status of each of the S-NSSAIs that are subjected to NSSAA, independently of the Allowed NSSAI, Rejected NSSAI, and Pending NSSAI.

In some implementations, in order to indicate that the current permission by NSSAA for a particular S-NSSAI is still available during re-authentication and re-authorization, the status information may indicate that it is activated (in an activated state), in a valid state, previously authorized, or under (re-)authorization. On the other hand, to indicate that the current permission by NSSAA for a particular S-NSSAI is unavailable during re-authentication and re-authorization, the status information may indicate that it is deactivated (in a deactivated state), in an invalid state, under (re-)authorization, or not (yet) authorized.

That is, if the status information for a particular currently allowed S-NSSAI indicates that it is under (re-)authorization, this may mean in some implementations that the current authorization for the particular S-NSSAI is still "valid" during re-authentication and re-authorization, or it may mean in other implementations that the current authorization for the particular S-NSSAI is "invalid" during re-authentication and re-authorization.

Thus, in some implementations, the available state may include multiple states (sub-states), for example, "authorized" and "under re-authentication and re-authorization". In other implementations, the unavailable state may include multiple states (sub-states), for example, "unauthorized" and "under re-authentication and re-authorization".

The status information indicating whether the current permission by NSSAA for a particular S-NSSAI is previously authorized, under (re-)authorization, or not (yet) authorized may be included in the data used to manage the operation of the NSSAA with respect to S-NSSAIs. This data may be referred to as "S-NSSAIs subject to Network Slice-Specific Authentication and Authorization".

To indicate that the current permission by NSSAA for a particular S-NSSAI is under (re-)authentication, the status information may indicate that this already authorized S-NS-SAI is to be reauthenticated as a precaution.

To indicate that the current permission by NSSAA for a particular S-NSSAI is unauthorized, the status information may indicate that this already authorized S-NSSAI is to be reauthenticated and reauthorized (additionally authenticated and authorized) due to doubt.

The AMF 2 may include information in the aforementioned NAS message to cause the UE 1 to update the status information for S-NSSAIs that are included in one or more of the above mentioned Allowed NSSAI, Rejected NSSAI, and Pending NSSAI. The UE 1 may update the status information for S-NSSAIs that are included in one or more of the above mentioned Allowed NSSAI, Rejected NSSAI, and Pending NSSAI, based on the received information.

Figure 3:
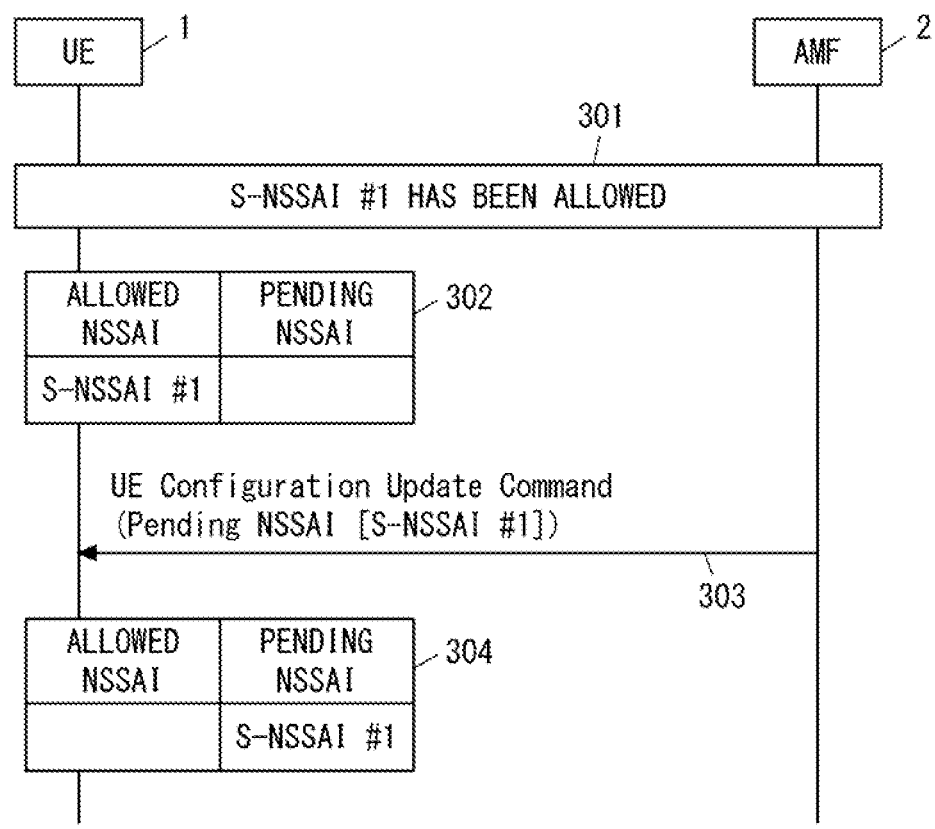
FIG. 3 is a sequence diagram showing an example of operations of a UE and an AMF according to an embodiment.

FIG. 3 shows an example of a UE Configuration Update procedure for updating the UE NSSAI configuration. In step 301, a particular S-NSSAI (in this case S-NSSAI #1) has been allowed for UE 1. Accordingly, in the UE NSSAI configuration (302) stored in UE 1, S-NSSAI #1 is included in the Allowed NSSAI. Similarly, in the UE context for the UE 1 managed by the AMF 2, S-NSSAI #1 is included in the Allowed NSSAI.

In step 303, the AMF 2 sends a UE Configuration Update Command message to the UE 1 indicating that the particular S-NSSAI is to be removed from the Allowed NSSAI and included in the Pending NSSAI. In response to receiving this UE Configuration Update Command message, the UE 1 updates its UE NSSAI configuration (NSSAI storage) stored in a (non-volatile) memory of the UE 1 (step 304). Specifically, if the particular S-NSSAI, included in the Pending NSSAI IE received via the UE Configuration Update Command message, is included in the Allowed NSSAI in the UE NSSAI configuration (NSSAI storage), the UE 1 shall remove this from the Allowed NSSAI and store it in the Pending NSSAI.

The UE Configuration Update Command message shown in FIG. 3 is one typical example of a message that can be used to cause the UE 1 to update the UE NSSAI configuration. However, the AMF 2 may instruct or request the UE 1 to update the UE NSSAI configuration via any other NAS message. For example, the AMF 2 may use a NAS message (e.g., Network Slice-Specific Authentication Command) that is sent from the AMF 2 to the UE 1 during a re-authentication and re-authorization procedure for the particular S-NSSAI. The other NAS message may be a Network Slice-Specific Authentication Command, and the AMF 2 may include the particular S-NSSAI in the Network Slice-Specific Authentication Command. In this case, the particular S-NSSAI may be included in its S-NSSAI IE.

The operation of the AMF 2 described using FIG. 2 and FIG. 3 allows the AMF 2 to inform the UE 1 that a particular S-NSSAI is to be moved from the Allowed NSSAI to the Pending NSSAI. For example, the UE 1 may be prohibited from requesting a PDU session establishment, or may suspend or abort a PDU session establishment procedure, based on information indicating the status of permission by NSSAA for each of the S-NSSAIs. More specifically, if the current permission by NSSAA for the particular S-NSSAI is associated with information indicating that it is unavailable (not allowed to use, not permitted) during reauthentication and reauthorization, or is updated as such, the UE 1 may be prohibited from establishing a PDU session associated with that S-NSSAI, or it may act to suspend or refrain from the procedure of establishing such a PDU session.

The procedure described using FIGS. 2 and 3 may be modified as follows. In step 301 of FIG. 3, the particular S-NSSAI (in this case S-NSSAI #1) may not be allowed for the UE 1 at this time. For example, the particular S-NSSAI was allowed for the UE 1 in the past, but may not be allowed or rejected for some reason (or specific reasons) at this time.

In this case, the AAA-S, AMF 2, and UE 1 may store S-NSSAIs that were allowed for the UE 1 in the past but are currently not allowed or rejected for some reason (or specific reasons) with or in conjunction with a cause IE indicating this reason. The cause IE indicating this reason may be, for example, "S-NSSAI is not available due to the failed or revoked network slice-specific authorization and authentication". In this case, in step 301, the AMF 2 may send a UE Configuration Update Command message to the UE 1 indicating that the particular S-NSSAI is to be included in the Rejected NSSAI, and may include in this message a cause IE indicating this reason in correspondence with the particular S-NSSAI.

In this case, in the UE NSSAI configuration (302) stored in the UE 1, S-NSSAI #1 is included in the Rejected NSSAI. Similarly, in the UE context for the UE 1 managed by the AMF 2, S-NSSAI #1 is included in the Rejected NSSAI. This may happen if, after the AAA-S has once performed a Revocation procedure for a particular S-NSSAI, the AAA-S invokes a re-authentication and re-authorization procedure for that particular S-NSSAI.

If the reauthentication and reauthorization procedure performed (e.g., between step 302 and step 303 in FIG. 3) are successful after the AAA-S has once performed the Revocation procedure for the particular S-NSSAI, then the UE 1 and AMF 2 may move S-NSSAI #1, which was managed in the Rejected NSSAI, to the Allowed NSSAI. This operation allows the UE 1 to utilize services provided by the relevant S-NSSAI.

If the particular S-NSSAI was stored in the Rejected NSSAI, in step 303, the AMF 2 may send a UE Configuration Update Command message to the UE 1 indicating that the particular S-NSSAI is to be included in the Pending NSSAI or Allowed NSSAI. In this case, in the UE NSSAI configuration (302) stored by the UE 1, and in the UE context managed by the AMF 2, S-NSSAI #1 may remain included in the Rejected NSSAI, or S-NSSAI #1 may be moved from the Rejected NSSAI to the Pending NSSAI or Allowed NSSAI. The UE Configuration Update Command message sent from the AMF 2 to the UE 1 may be sent per Access Type.

Figure 4:
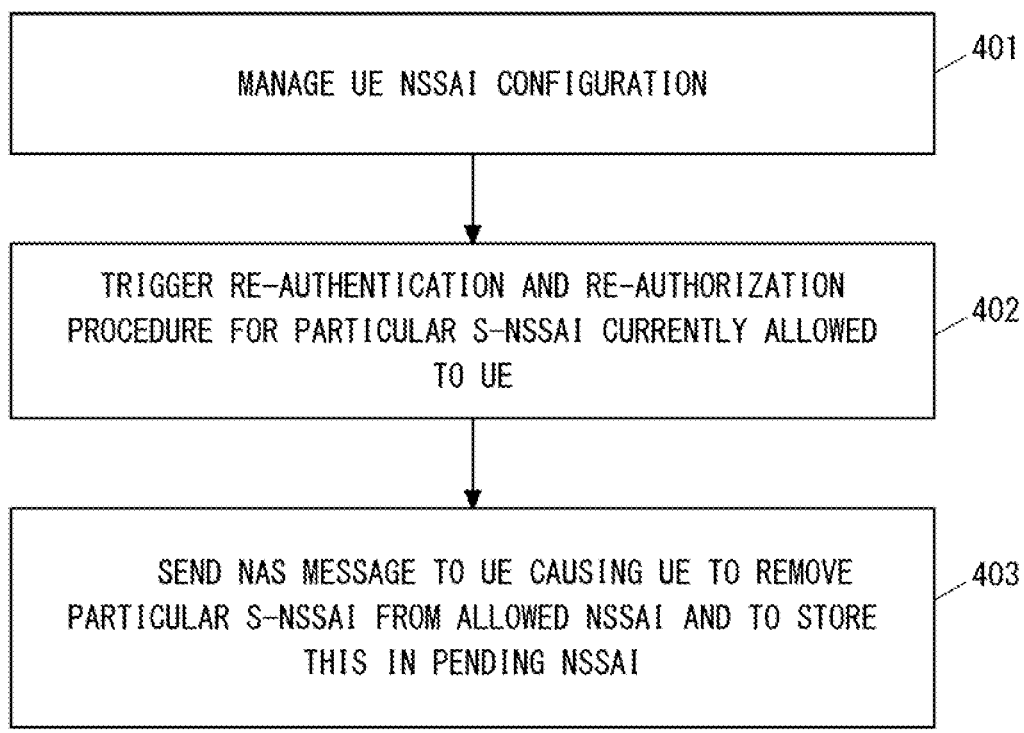
FIG. 4 is a flowchart showing an example of operation of an AMF according to an embodiment.

FIG. 4 is a flowchart showing another example of the operation of the AMF 2. Step 401 is similar to step 201 in FIG. 2. In step 402, the AMF 2 triggers a re-authentication and re-authorization procedure (a renewed or additional NSSAA) for a particular S-NSSAI currently allowed to the UE 1. The NSSAA procedure may be the same as the existing one. The existing NSSAA procedure is specified in section 4.2.9.1 of Non-Patent Literature 2.

As previously described, the AMF 2 may again perform Network Slice-Specific Authentication and Authorization (NSSAA) on one or more currently allowed S-NSSAIs of the UE 1. More specifically, if an AAS server (AAA-S) triggers re-authentication of one or more currently allowed S-NSSAIs, then the AMF triggers the initiation of NSSAA for these S-NSSAIs. In addition, the AMF 2 may determine, based on changes in the UE 1's subscription information, that reauthentication is required for one or more currently allowed S-NSSAIs of the UE 1. Furthermore, when the AMF 2 receives a Registration Request message for Mobility Registration Update or Periodic Registration Update from the UE 1, it may determine, for example based on operator policy, that re-authentication is required for one or more currently allowed S-NSSAIs. In addition, as well as these conditions, the AMF 2 may determine that re-authentication is required for one or more currently allowed S-NSSAIs, for example based on operator policy. In these cases, the AMF 2 triggers the initiation of NSSAA for an S-NSSAI(s) that need to be reauthenticated.

The AMF 2 may send an authentication request message to the AUSF 4 in order to initiate (or trigger the initiation of) the re-authentication and re-authorization procedure. The authentication request message may be, for example, an Nausf_Communication_EAPMessage_Transfer message or an Nausf_NSSAA_Authenticate Request message. The AMF 2 may send the S-NSSAI required to be (re)authenticated to the AUSF 4 in the above message or in a separate message to the AUSF 4. The AMF 2 may send the UE User ID for EAP authentication (EAP ID) for the S-NSSAI that needs to be (re)authenticated to the AUSF 4 in the above message, or in a separate message to the AUSF 4. The AMF 2 may send the Generic Public Subscription Identifier (GPSI) of the UE 1 in the above message to the AUSF 4, or in a separate message to the AUSF 4. The AMF2 may send the address of the AAA-S to the AUSF4 by including it in the above message, or it may send it to the AUSF4 by another message. Prior to this, the AMF 2 may request the UE 1 for the EAP ID for the relevant S-NSSAI.

In step 403, in response to the initiation of the re-authentication and re-authorization procedure for the particular S-NSSAI, the AMF 2 sends a NAS message to the UE 1, similar to step 202 in FIG. 2. More specifically, the AMF 2 sends to the UE 1 a NAS message causing the UE 1 to remove the particular S-NSSAI from the Allowed NSSAI in the UE NSSAI configuration and to store this in the Pending NSSAI in the UE NSSAI configuration.

As described above, the UE NSSAI configuration of the UE 1 may include status information indicating the permission status of S-NSSAIs by NSSAA. The status information for S-NSSAIs may indicate whether the current permission by NSSAA for each S-NSSAI is still available (allowed to use, or permitted) or unavailable (not allowed to use, or not permitted) during re-authentication and re-authorization. In this case, in step 403, the AMF 2 may include, in the NAS message, information to cause the UE 1 to change the status of S-NSSAI #1 from the available state to the unavailable state. Instead, the AMF 2 may include information in the NAS message to instruct the UE 1 that the status of S-NSSAI #1 is to remain in the available state. The UE 1 updates the status information of S-NSSAI #1 based on the received information.

Step 403 may take place before or after sending the authentication request message for NSSAA from the AMF 2 to the AUSF 4. For example, the AMF 2 may perform step 403 in response to being notified via the AUSF 4 by the AAA-S 9 that a reauthentication event for the particular S-NSSAI has occurred. The AMF 2 may perform step 202 in response to determining, based on operator policy, that reauthentication for the particular S-NSSAI is required. The AMF 2 may perform step 202 in response to determining, based on a change in operator policy, that reauthentication for the particular S-NSSAI is required. The AMF 2 may perform step 403 in response to determining, based on a change in the subscription information, that re-authentication for the particular S-NSSAI is required. For example, the AMF 2 may perform step 403 in response to sending the Nausf_Communication_EAPMessage_Transfer message to the AUSF 4. For example, the AMF 2 may perform step 403 in response to requesting the UE 1 for the EAP ID for the relevant S-NSSAI.

The operation shown in FIG. 4 can, for example, contribute to improving security. Specifically, the UE 1 cannot request establishment of a PDU session associated with a particular S-NSSAI that is included in the pending NSSAI. Therefore, the AMF 2 can prevent the UE 1 from requesting to establish a new PDU session associated with a particular S-NSSAI when a re-authentication and re-authorization procedure for that particular S-NSSAI is ongoing.

For example, the UE 1 may be prohibited from requesting PDU session establishment, or may suspend or abort a PDU session establishment procedure, based on information indicating the status of permission by NSSAA for each of the S-NSSAIs. More specifically, if the current permission by NSSAA for the particular S-NSSAI is associated with information indicating that it is unavailable (not allowed to use, not permitted) during reauthentication and reauthorization, or is updated as such, the UE 1 may be prohibited from establishing a PDU session associated with that S-NSSAI, or it may act to suspend or refrain from the procedure of establishing such a PDU session.

Figure 5:
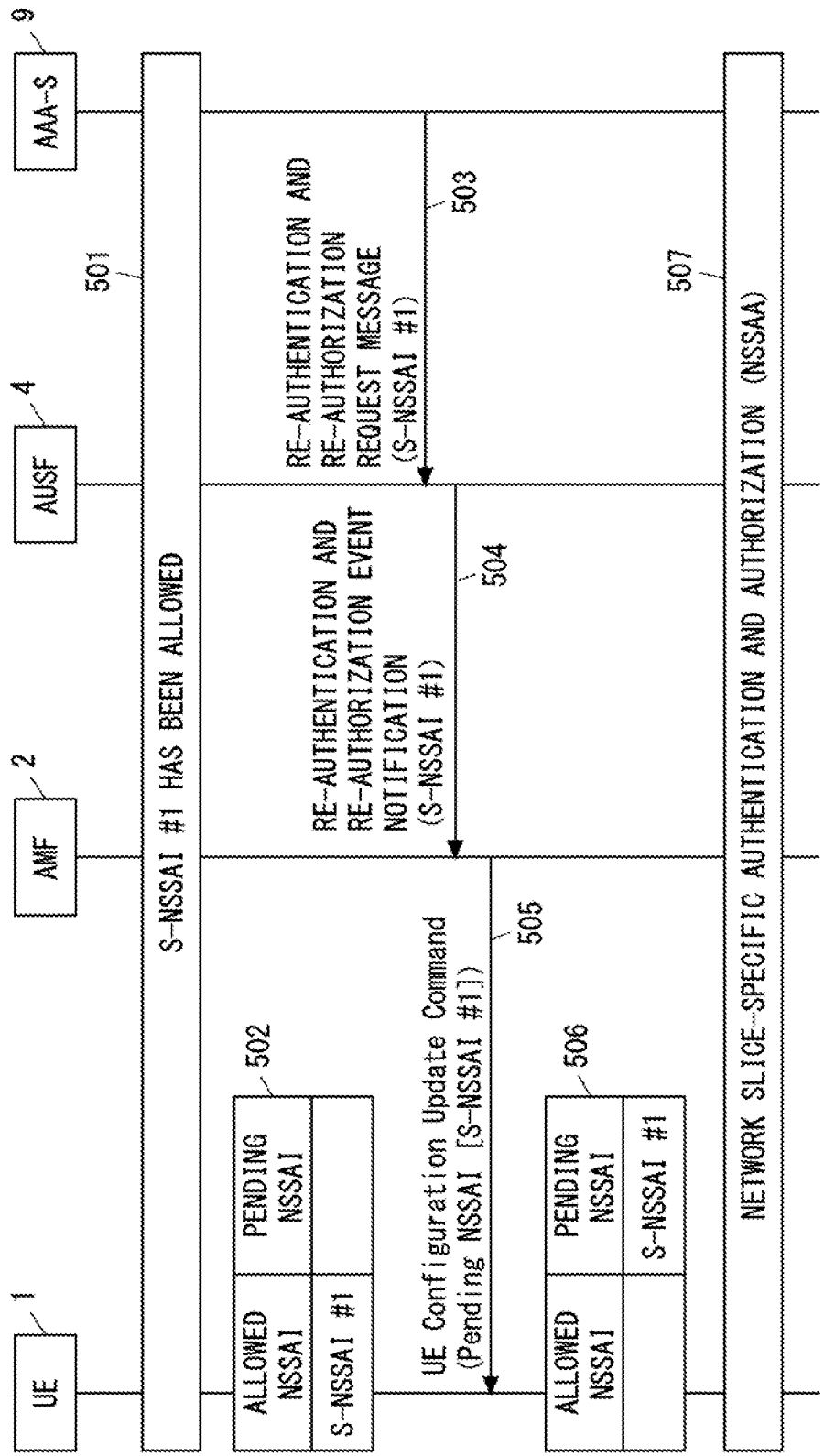
FIG. 5 is a sequence diagram showing an example of operations of a UE, an AMF and an AUSF according to an embodiment.

FIG. 5 shows an example of a re-authentication and re-authorization procedure initiated (or triggered) by the AAA-S. In step 501, a particular S-NSSAI (in this case S-NSSAI #1) has been allowed to the UE 1. Accordingly, in the UE NSSAI configuration (502) stored in the UE 1, S-NSSAI #1 is included in the Allowed NSSAI. Similarly, in the UE context for the UE 1 managed by the AMF 2, S-NSSAI #1 is included in the Allowed NSSAI.

In step 503, the AAA-S 9 requests re-authentication and re-authorization for the network slice identified by S-NSSAI #1. Specifically, the AAA-S 9 may send a re-authentication and re-authorization request message to the AUSF 4. This message may be, for example, a Nausf_Re-Auth Request message or an AAA Protocol Re-Auth Request message. The message indicates S-NSSAI #1 and further indicates the Generic Public Subscription Identifier (GPSI) of the UE 1. The message may be sent directly from the AAA-S 9 to the AUSF 4, or may be sent to the AUSF 4 via an AAA Proxy (AAA-P) not illustrated.

In step 504, the AUSF 4 notifies the AMF 2 that an event of re-authentication and re-authorization of S-NSSAI #1 for the UE 1 has occurred via an NF service provided by the AUSF 4. The notification may be, for example, a Namf_Re-Auth Request message or a NAusf_NSSAA_Notify message. The notification indicates S-NSSAI #1 and further indicates the GPSI of the UE 1.

In step 505, the AMF 2 sends a UE Configuration Update Command message to the UE 1 indicating that the particular S-NSSAI is to be removed from the Allowed NSSAI and included in the Pending NSSAI. In response to receiving the UE Configuration Update Command message, the UE 1 updates the UE NSSAI configuration (NSSAI storage) stored in a (non-volatile) memory of the UE 1 (step 506). Specifically, if the particular S-NSSAI included in a Pending NSSAI IE received via the UE Configuration Update Command message is included in the Allowed NSSAI in the UE NSSAI configuration (NSSAI storage), the UE 1 removes it from the Allowed NSSAI and stores it in the Pending NSSAI. Meanwhile, the AMF 2 removes S-NSSAI #1 from the Allowed NSSAI in the UE context for the UE 1 and stores (or adds)S-NSSAI #1 to the Pending NSSAI in the UE context for the UE 1. In other words, the AMF 2 may move (or change)S-NSSAI #1 from the Allowed NSSAI to the Pending NSSAI.

As described above, the UE NSSAI configuration of the UE 1 may include status information indicating the permission status of S-NSSAIs by NSSAA. The status information for S-NSSAIs may indicate whether the current permission by NSSAA for each S-NSSAI is still available (allowed to use, or permitted) or unavailable (not allowed to use, or not permitted) during re-authentication and re-authorization. In this case, in step 506, the AMF 2 may include, in the NAS message, information to cause the UE 1 to change the status of S-NSSAI #1 from the available state to the unavailable state. Instead, the AMF 2 may include information in the NAS message to instruct the UE 1 that the status of S-NSSAI #1 is to remain in the available state. The UE 1 updates the status information of S-NSSAI #1 based on the received information.

In step 507, the AMF 2 triggers a Network Slice-Specific Authentication and Authorization (NSSAA) procedure. The NSSAA procedure may be the same as the existing one. The existing NSSAA procedure is specified in section 4.2.9.1 of Non-Patent Literature 2.

The procedure of FIG. 5 may be modified as appropriate. For example, step 505 (and step 506) may take place after step 507 has been initiated (i.e., during the execution of the NSSAA procedure).

Figure 6:
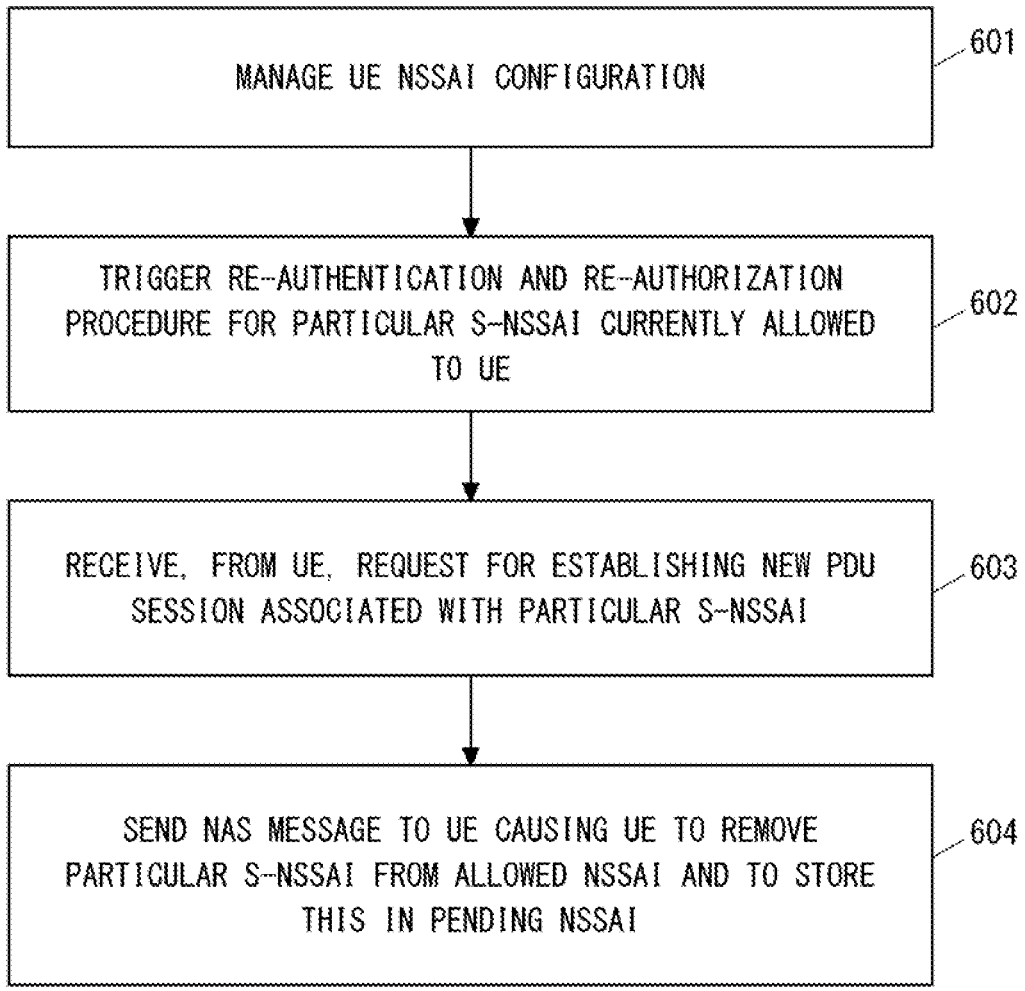
FIG. 6 is a flowchart showing an example of operation of an AMF according to an embodiment.

FIG. 6 is a flowchart showing another example of the operation of the AMF 2. Steps 601 and 602 are similar to steps 401 and 402 in FIG. 4. The re-authentication and re-authorization procedure in step 602 is initiated by the AMF 2 for the reasons described above or for other reasons.

In step 603, the AMF 2 receives from the UE 1 a request for establishing a new PDU session associated with a particular S-NSSAI for which the re-authentication and re-authorization procedure (NSSAA procedure) is in progress (ongoing). In other words, after triggering the initiation of the re-authentication and re-authorization procedure, the AMF 2 receives a request from the UE 1 to establish a new PDU session associated with a particular S-NSSAI. More specifically, the AMF 2 receives a NAS message (e.g., UL NAS Transport message) from the UE 1. The NAS message contains the particular S-NSSAI, a new PDU session ID, and an N1 SM container (PDU Session Establishment Request).

In step 604, in response to receiving the request from the UE 1 to establish a new PDU session associated with the particular S-NSSAI for which the re-authentication and re-authorization procedure is ongoing, the AMF 2 sends a NAS message to the UE 1 similar to step 202 in FIG. 2. In this case, the AMF 2 sends a NAS message similar to step 202 in FIG. 2 to the UE 1. More specifically, the AMF 2 sends a NAS message to the UE 1 causing the UE 1 to remove the particular S-NSSAI from the Allowed NSSAI in the UE NSSAI configuration and to store it in the Pending NSSAI in the UE NSSAI configuration. The AMF 2 may determine the receipt of a new PDU session establishment request associated with the particular S-NSSAI based on the fact that the NAS message received in step 603 contains the particular S-NSSAI and a new PDU session ID.

In one example, the NAS message in step 604 may be a UE Configuration Update Command message. Specifically, the AMF 2 may include the particular S-NSSAI in a Pending NSSAI IE and supply this to the UE 1 via a UE Configuration Update Command message. As another example, the AMF 2 may create both an updated Allowed NSSAI with the particular S-NSSAI removed from it, and an updated Pending NSSAI with the particular S-NSSAI added to it, and provide these to the UE 1 via a UE Configuration Update Command message In another example, the NAS message may be a message indicating that the PDU session establishment request received from the UE 1 is rejected. This message may include a cause Information Element (IE) indicating that a re-authentication and re-authorization procedure is ongoing. More specifically, the AMF 2 may generate a PDU Session Establishment Reject message and send a NAS message (e.g., DL NAS Transport message) carrying an N1 SM container containing it to the UE 1. The NAS message may contain a Pending NSSAI IE containing the particular S-NSSAI. As another example, the NAS message may contain an updated Allowed NSSAI with the particular S-NSSAI removed from it and an updated Pending NSSAI with the particular S-NSSAI added to it. Additionally or alternatively, the NAS message (e.g., DL NAS Transport message) may contain a new cause IE (e.g., 5GMM Cause IE) indicating that a re-authentication and re-authorization procedure is ongoing. Additionally or alternatively, the PDU Session Establishment Reject message generated by the AMF 2 may contain a new cause IE (e.g., 5GSM Cause IE) indicating that a reauthentication and reauthorization procedure is ongoing.

As described above, the UE NSSAI configuration of the UE 1 may include status information indicating the permission status of S-NSSAIs by NSSAA. The status information for S-NSSAIs may indicate whether the current permission by NSSAA for each S-NSSAI is still available (allowed to use, or permitted) or unavailable (not allowed to use, or not permitted) during re-authentication and re-authorization. In this case, in step 604, the AMF 2 may include, in the NAS message, information to cause the UE 1 to change the status of S-NSSAI #1 from the available state to the unavailable state. Instead, the AMF 2 may include information in the NAS message to instruct the UE 1 that the status of S-NSSAI #1 is to remain in the available state. The UE 1 updates the status information of S-NSSAI #1 based on the received information.

The AMF 2 may reject the PDU session establishment request received in step 603. Alternatively, AMF 2 may suspend (or refrain from) the PDU session establishment request received in step 603, or the response (accept or reject) to that PDU session establishment request, at least until the result of the NSSAA procedure is obtained. The AMF 2 may resume the suspended PDU session establishment procedure if the NSSAA procedure is successful.

The operation shown in FIG. 6 can, for example, contribute to improved security. Specifically, the UE 1 cannot request the establishment of a PDU session associated with a particular S-NSSAI that is included in the pending NSSAI. Therefore, the AMF 2 can deter the UE 1 from further requesting the establishment of a new PDU session associated with an S-NSSAI for which a re-authentication and re-authorization procedure is ongoing.

Figure 7:
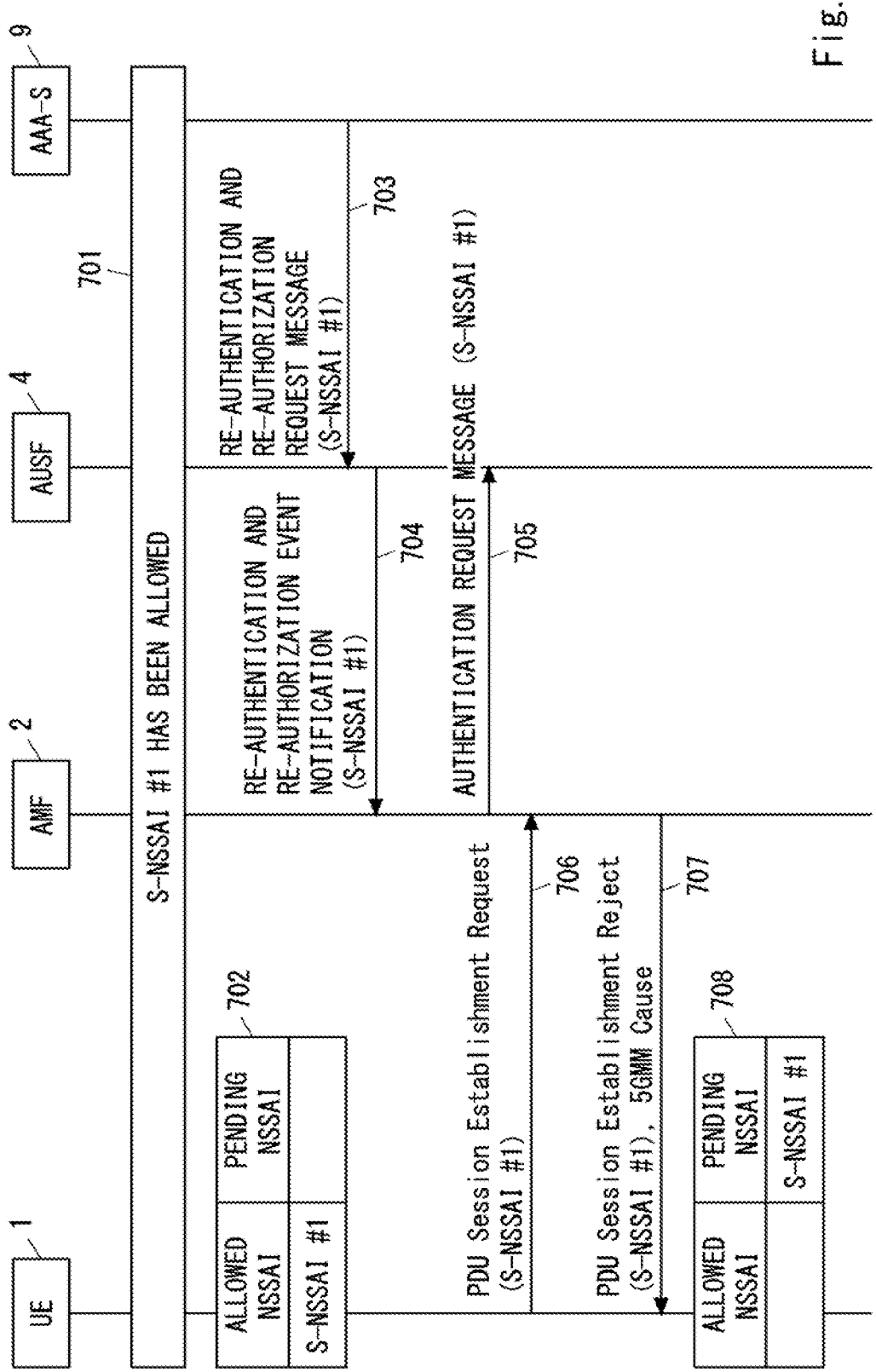
FIG. 7 is a sequence diagram showing an example of operations of a UE, an AMF and an AUSF according to an embodiment.

FIG. 7 shows an example of a re-authentication and re-authorization procedure initiated (or triggered) by the AAA-S. Steps 701 to 704 in FIG. 7 are similar to steps 501 to 504 in FIG. 5. In step 705, AMF 2 triggers a re-authentication and re-authorization procedure (a renewed or additional NSSAA) for a particular S-NSSAI currently permitted to the UE 1 in response to the receipt of the re-authentication and re-authorization event notification message. More specifically, the AMF 2 sends an authentication request message to the AUSF 4 to initiate (or trigger the initiation of) the re-authentication and re-authorization procedure. The authentication request message may be, for example, a Nausf_Communication_EAPMessage_Transfer message or a Nausf_NSSAA_Authenticate Request message. The AMF 2 may send the S-NSSAI required to be (re)authenticated to the AUSF 4 in the above message or in a separate message to the AUSF 4. The AMF 2 may send the UE User ID for EAP authentication (EAP ID) for the S-NSSAI that needs to be (re)authenticated to the AUSF 4 in the above message, or in a separate message to the AUSF 4. The AMF 2 may send the Generic Public Subscription Identifier (GPSI) of the UE 1 in the above message to the AUSF 4, or in a separate message to the AUSF 4. The AMF 2 may send the address of the AAA-S to the AUSF4 by including it in the above message, or it may send it to the AUSF4 by another message.

In step 706, the AMF 2 receives a request from the UE 1 for the establishment of a new PDU session associated with S-NSSAI #1 for which a re-authentication and re-authorization procedure is ongoing. More specifically, the AMF 2 receives a NAS message (e.g., UL NAS Transport message) from the UE 1. The NAS message contains S-NSSAI #1, a new PDU session ID, and an N1 SM container (PDU Session Establishment Request).

In step 707, the AMF 2 determines that it has received a new PDU session establishment request associated with S-NSSAI #1 for which a re-authentication and re-authorization procedure is ongoing. For example, the AMF 2 may determine the receipt of a new PDU session establishment request associated with S-NSSAI #1 based on the fact that the NAS message received in step 706 includes S-NSSAI #1 and a new PDU session ID. In this case, the AMF 2 responds to the UE 1 with a NAS message indicating the rejection of the establishment of the new PDU session. Specifically, the AMF 2 may generate a PDU Session Establishment Reject message and send it to the UE 1. The PDU Session Establishment Reject message may contain a new 5GSM cause indicating that a re-authentication and re-authorization procedure is ongoing. Additionally or alternatively, the AMF 2 may send to the UE 1 a NAS message (e.g., DL NAS Transport message) that includes an N1 SM container containing a PDU Session Establishment Reject message and includes a new 5GMM cause indicating that a reauthentication and reauthorization procedure is ongoing. The NAS message may contain a Pending NSSAI IE containing S-NSSAI #1. As another example, the NAS message may contain an updated Allowed NSSAI with S-NSSAI #1 removed from it and an updated Pending NSSAI with S-NSSAI #1 added to it.

In addition, the AMF 2 removes S-NSSAI #1 from the Allowed NSSAI in the UE context for the UE 1 and stores (or adds)S-NSSAI #1 to the Pending NSSAI in the UE context for the UE 1. In step 708, UE 1 updates its UE NSSAI configuration (NSSAI storage) stored in a (non-volatile) memory of the UE 1. Specifically, if S-NSSAI #1 in the Pending NSSAI IE received via the NAS message is included in the Allowed NSSAI in the UE NSSAI storage, the UE 1 removes it from the Allowed NSSAI and stores it in the Pending NSSAI.

Figure 8:
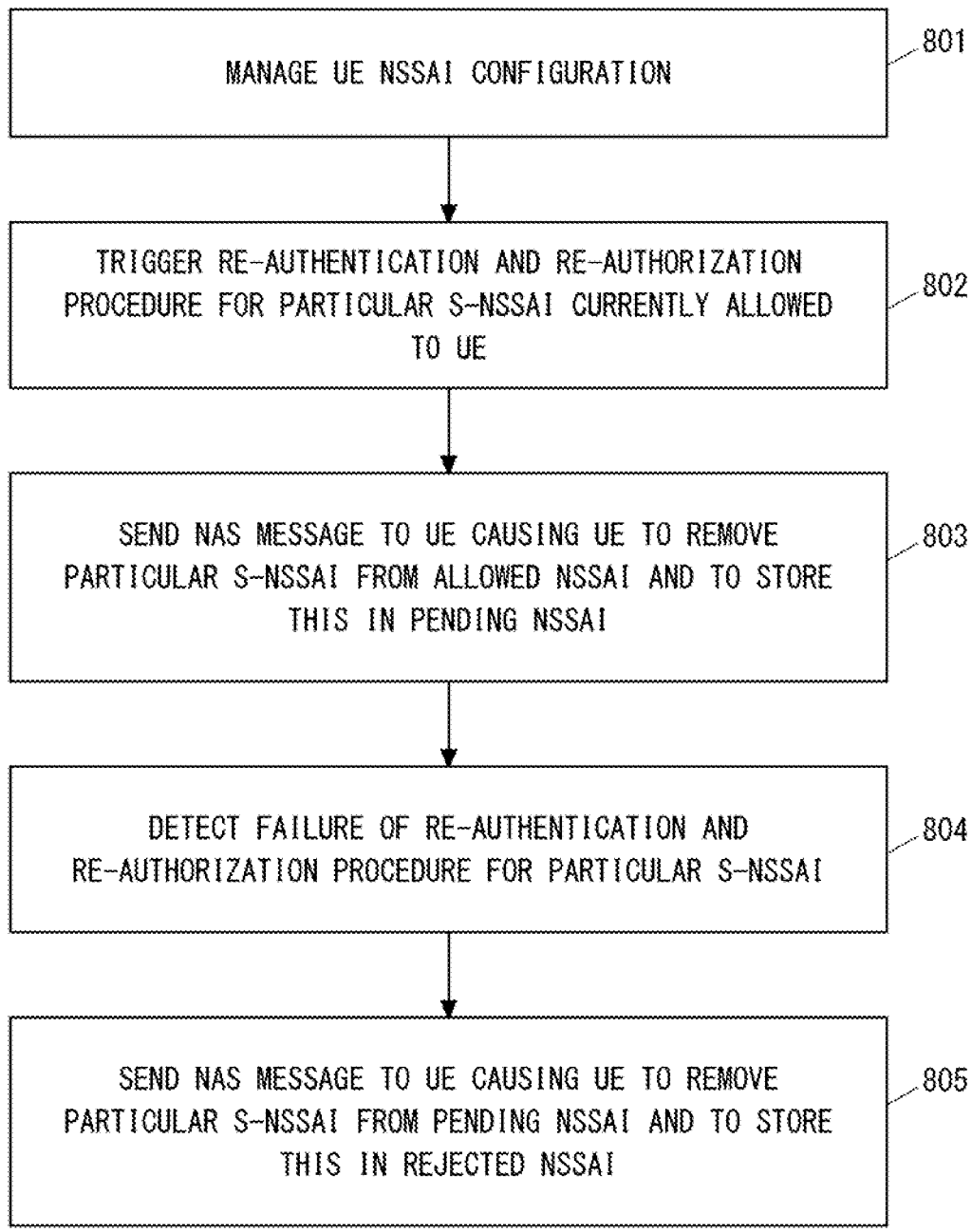
FIG. 8 is a flowchart showing an example of operation of an AMF according to an embodiment.

FIG. 8 is a flowchart showing another example of the operation of the AMF 2. Steps 801-803 are similar to steps 401-403 in FIG. 4. The re-authentication and re-authorization procedure in step 802 is initiated by the AMF 2 for the reasons described above or for other reasons.

In step 804, the AMF 2 detects a failure of the re-authentication and re-authorization procedure for the particular S-NSSAI. For example, the AMF 2 may determine if it has received a message from the AUSF 4 indicating a failure of the EAP-based authentication procedure for the particular S-NSSAI. In response to the failure of the re-authentication and re-authorization procedure for the particular S-NSSAI, the AMF 2 may remove that particular S-NSSAI from the Pending NSSAI in the UE context for the UE 1 and store it in the Rejected NSSAI.

In step 805, the AMF 2 sends a NAS message to the UE 1 causing the UE 1 to remove the particular S-NSSAI from the Pending NSSAI in the UE NSSAI configuration and to store this in the Rejected NSSAI in the UE NSSAI configuration. Specifically, the AMF 2 includes the particular S-NSSAI in a Rejected NSSAI IE and provides this to the UE 1 via the NAS message. In another example, the AMF 2 may create both an updated Pending NSSAI from which the particular S-NSSAI has been removed, and an updated Rejected NSSAI to which the particular S-NSSAI has been added, and provide these to the UE 1 via the NAS message. The NAS message may be, for example, a UE Configuration Update Command message. Alternatively, the NAS message may be a NAS MM transport message indicating an EAP failure. This NAS message may contain a cause IE indicating a failure of a re-authentication and re-authorization procedure. In other words, the particular S-NSSAI included in that NAS message may be associated with a cause IE indicating a failure of a re-authentication and re-authorization procedure. The cause IE may be, for example, "S-NSSAI is not available due to the failed or revoked network slice-specific authorization and authentication".

In addition, if an establishment procedure for a new session associated with the particular S-NSSAI is taking place or has been suspended, then AMF 2 may send a NAS message to the UE 1 indicating the rejection of the establishment of that PDU session. Specifically, the AMF 2 may generate a PDU Session Establishment Reject message and send it to the UE 1. The PDU Session Establishment Reject message may contain a new 5GSM cause indicating a failure of a re-authentication and re-authorization procedure (e.g., NSSAA failure). Additionally or alternatively, the AMF 2 may send to the UE 1 a NAS message (e.g., DL NAS Transport message) that includes an N1 SM container containing a PDU Session Establishment Reject message and includes a new 5GMM cause indicating a failure of a re-authentication and re-authorization procedure. The NAS message may contain a Rejected NSSAI IE containing S-NSSAI #1. As another example, the NAS message may contain an updated Pending NSSAI with S-NSSAI #1 removed from it and an updated Rejected NSSAI with S-NSSAI #1 added to it. The NAS message may contain a cause IE indicating a failure of a re-authentication and re-authorization procedure. In other words, the particular S-NSSAI included in the NAS message may be associated with a cause IE indicating a failure of a re-authentication and re-authorization procedure. The cause IE may be, for example, "S-NSSAI is not available due to the failed or revoked network slice-specific authorization and authentication".

Second Embodiment

This embodiment provides a solution to avoid collisions with the re-authentication and re-authorization procedures for network slicing and the establishment of new PDU sessions. A configuration example of a cellular network for this embodiment may be the same as the example shown in FIG. 1.

Figure 9:
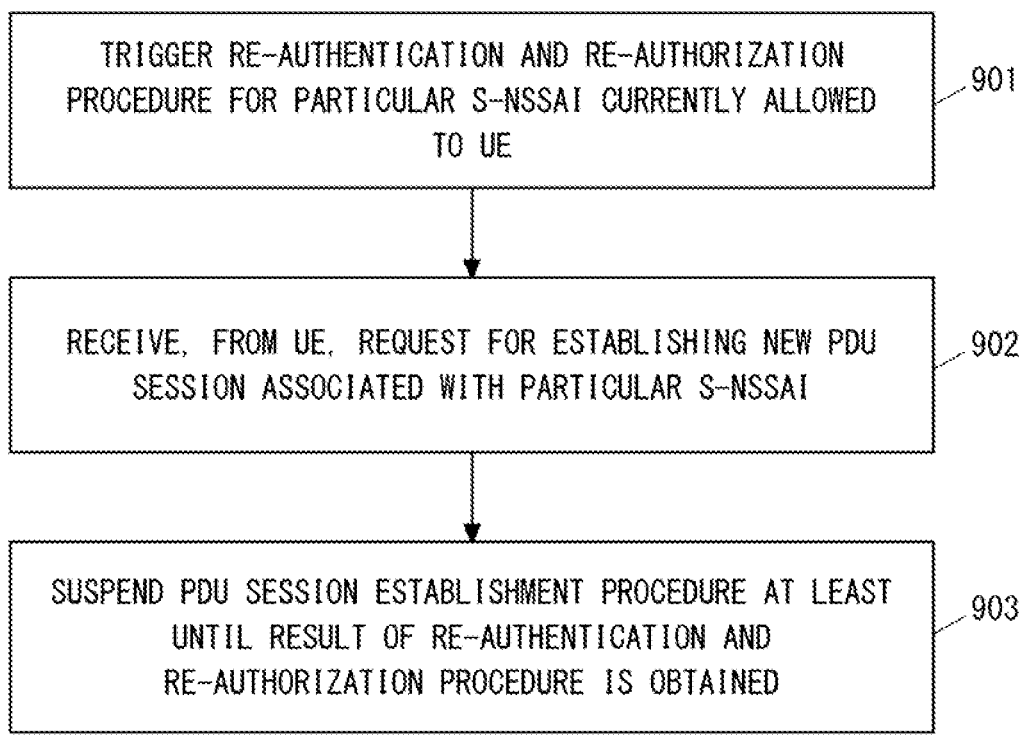
FIG. 9 is a flowchart showing an example of operation of an AMF according to an embodiment.

FIG. 9 is a flowchart showing an example of the operation of the AMF 2. In step 901, the AMF 2 triggers a re-authentication and re-authorization procedure (a renewed or additional NSSAA) for a particular S-NSSAI currently allowed to the UE 1. The NSSAA procedure may be the same as the existing one. The existing NSSAA procedure is specified in section 4.2.9.1 of Non-Patent Literature 2.

In step 902, the AMF 2 receives from the UE 1 a request for establishing a new PDU session associated with a particular S-NSSAI for which the re-authentication and re-authorization procedure (NSSAA procedure) is ongoing. More specifically, the AMF 2 receives a NAS message (e.g., UL NAS Transport message) from the UE 1. The NAS message contains the particular S-NSSAI, a new PDU session ID, and an N1 SM container (PDU Session Establishment Request). For example, the AMF 2 may determine the receipt of a new PDU session establishment request associated with the particular S-NSSAI based on the fact that the NAS message received in step 902 contains the particular S-NSSAI and a new PDU session ID.

In step 903, the AMF 2 suspends (or refrains from) the PDU session establishment procedure, or the response (accept or reject) to that PDU session establishment request, at least until the result of the NSSAA procedure is obtained. For example, the AMF 2 may refer to the UE context for the UE 1 and, if the particular S-NSSAI is stored in the Pending NSSAI, suspend (or refrain from) the PDU session establishment procedure until at least the result of the NSSAA procedure is obtained.

The operation shown in FIG. 9 allows the AMF 2 to prevent the establishment of a new PDU session associated with a network slice for which a re-authentication and re-authorization procedure is ongoing.

As described in the first embodiment (step 604 in FIG. 6), the AMF 2 may send to the UE 1 a NAS message causing the UE 1 to remove the particular S-NSSAI from the Allowed NSSAI in the UE NSSAI configuration and store it in the Pending NSSAI in the UE NSSAI configuration. This allows AMF 2 to deter the UE 1 from further requesting the establishment of a new PDU session associated with an S-NSSAI for which a re-authentication and re-authorization procedure is ongoing.

As described above, the UE NSSAI configuration of the UE 1 may include status information indicating the permission status of S-NSSAIs by NSSAA. The status information for S-NSSAIs may indicate whether the current permission by NSSAA for each S-NSSAI is still available (allowed to use, or permitted) or unavailable (not allowed to use, or not permitted) during re-authentication and re-authorization. In this case, the AMF 2 may include, in the NAS message, information to cause the UE 1 to change the status of S-NSSAI #1 from the available state to the unavailable state. Instead, the AMF 2 may include information in the NAS message to instruct the UE 1 that the status of S-NSSAI #1 is to remain in the available state. The UE 1 updates the status information of S-NSSAI #1 based on the received information.

For example, the UE 1 may be prohibited from requesting PDU session establishment, or may suspend or abort a PDU session establishment procedure, based on information indicating the status of permission by NSSAA for each of the S-NSSAIs. More specifically, if the current permission by NSSAA for the particular S-NSSAI is associated with information indicating that it is unavailable (not allowed to use, not permitted) during reauthentication and reauthorization, or is updated as such, the UE 1 may be prohibited from establishing a PDU session associated with that S-NSSAI, or it may act to suspend or refrain from the procedure of establishing such a PDU session.

The AMF 2 may resume the suspended PDU session establishment procedure if the NSSAA procedure for re-authentication is successful.

Figure 10:
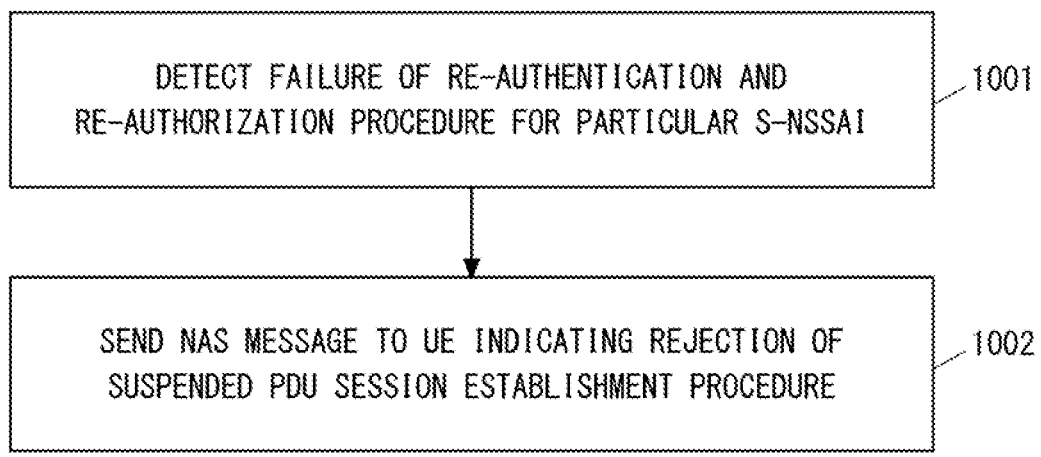
FIG. 10 is a flowchart showing an example of operation of an AMF according to an embodiment.

On the other hand, the AMF 2 may reject the suspended PDU session establishment procedure if the NSSAA procedure for re-authentication fails. FIG. 10 is a flowchart showing an example of the operation of the AMF 2 when a re-authentication and re-authorization procedure (NSSAA procedure) for a particular S-NSSAI fails. The operation described in FIG. 10 takes place after step 903 in FIG. 9.

In step 1001, the AMF 2 detects (or recognizes) a failure of a re-authentication and re-authorization procedure for a particular S-NSSAI. The AMF 2 may detect a failure of the NSSAA procedure for re-authentication by receiving a notification from the AUSF 4 indicating a failure of the NSSAA procedure (EAP authentication). More specifically, the AMF 2 may determine whether it has received a message from the AUSF 4 indicating a failure of the EAP-based authentication procedure for the particular S-NSSAI. Additionally or alternatively, the AMF 2 may start a timer upon triggering a re-authentication and re-authorization procedure (NSSAA procedure) and determine that the re-authentication and re-authorization procedure has failed if that timer expires before the result (success or failure) of the re-authentication and re-authorization procedure is received from the AUSF 4.

In step 1002, the AMF 2 sends a NAS message to the UE 1 indicating the rejection of the suspended PDU session establishment procedure. Specifically, the AMF 2 may generate a PDU Session Establishment Reject message and send it to the UE 1. The PDU Session Establishment Reject message may contain a new 5GSM cause indicating a failure of a re-authentication and re-authorization procedure (e.g., NSSAA failure). Additionally or alternatively, the AMF 2 may send to the UE 1 a NAS message (e.g., DL NAS Transport message) that includes an N1 SM container containing the PDU Session Establishment Reject message and includes a new 5GMM cause indicating a failure of a re-authentication and re-authorization procedure. The NAS message may contain a Rejected NSSAI IE containing the particular S-NSSAI. As another example, the NAS message may contain an updated Allowed NSSAI (or Pending NSSAI) with the particular S-NSSAI removed from it and an updated Rejected NSSAI with the particular S-NSSAI added to it. The NAS message may contain a cause IE indicating a failure of a re-authentication and re-authorization procedure. In other words, the particular S-NSSAI included in that NAS message may be associated with a cause IE indicating a failure of a re-authentication and re-authorization procedure. The cause IE may be, for example, "S-NSSAI is not available due to the failed or revoked network slice-specific authorization and authentication".

Third Embodiment

This embodiment provides other solutions to avoid collisions with the re-authentication and re-authorization procedures for network slicing and the establishment of new PDU sessions. A configuration example of a cellular network for this embodiment may be the same as the example shown in FIG. 1.

Figure 11:
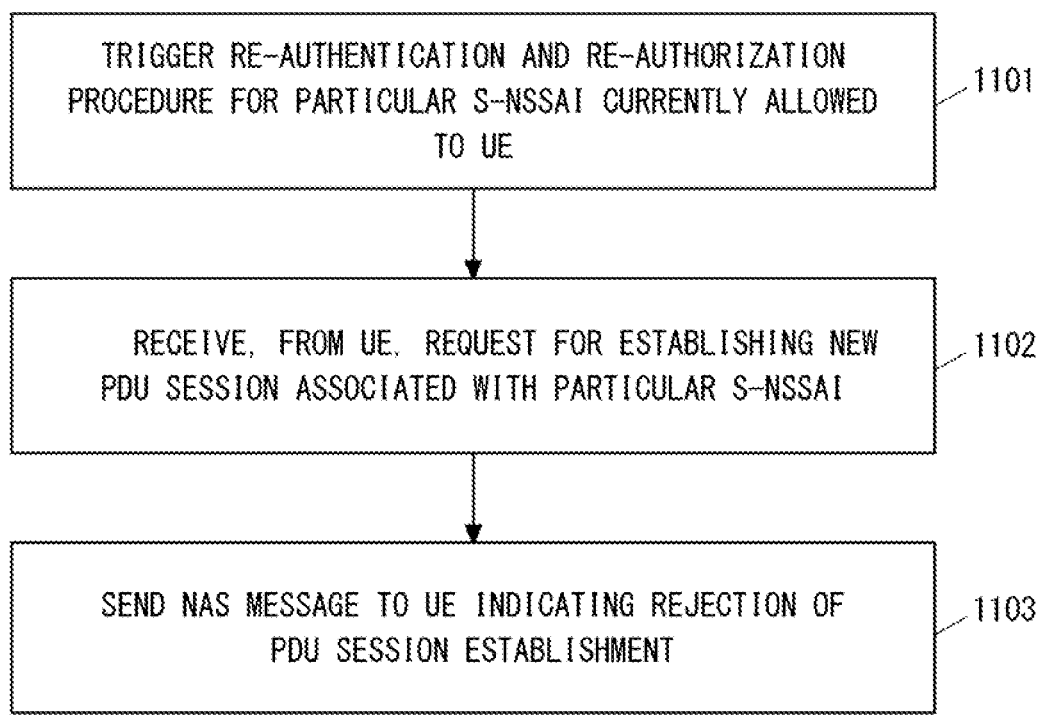
FIG. 11 is a flowchart showing an example of operation of an AMF according to an embodiment.

FIG. 11 is a flowchart showing an example of the operation of the AMF 2. Steps 1101 and 1102 are similar to steps 901 and 902 in FIG. 9. That is, in step 1101, the AMF 2 triggers a re-authentication and re-authorization procedure (renewed or additional NSSAA) for a particular S-NSSAI currently allowed to the UE 1. In step 1102, the AMF 2 receives from the UE 1 a request for establishing a new PDU session associated with the particular S-NSSAI for which the re-authentication and re-authorization procedure (NSSAA procedure) is ongoing.

In step 1103, the AMF 2 rejects the PDU session establishment request received in step 1102. Specifically, it responds to the UE 1 with a NAS message indicating that the PDU session establishment request is rejected. The message may include a cause IE indicating that a re-authentication and re-authorization procedure is ongoing. More specifically, the AMF 2 may generate a PDU Session Establishment Reject message and send a NAS message (e.g., DL NAS Transport message) carrying the N1 SM container containing it to the UE 1. The NAS message may include a Pending NSSAI IE containing the particular S-NSSAI. As another example, the NAS message may include an updated Allowed NSSAI with the particular S-NSSAI removed from it and an updated Pending NSSAI with the particular S-NSSAI added to it. Additionally or alternatively, the NAS message (e.g., DL NAS Transport message) may contain a new cause IE (e.g., 5GMM Cause IE) indicating that a re-authentication and re-authorization procedure is ongoing. Additionally or alternatively, the PDU Session Establishment Reject message generated by the AMF 2 may contain a new cause IE (e.g., 5GSM Cause IE) indicating that a reauthentication and reauthorization procedure is ongoing.

The operation shown in FIG. 11 allows the AMF 2 to prevent the establishment of a new PDU session associated with a network slice for which a re-authentication and re-authorization procedure is ongoing.

Fourth Embodiment

This embodiment provides an example of the operation of the AMF 2 when re-authentication and re-authorization of a network slice fails.

Figure 12:
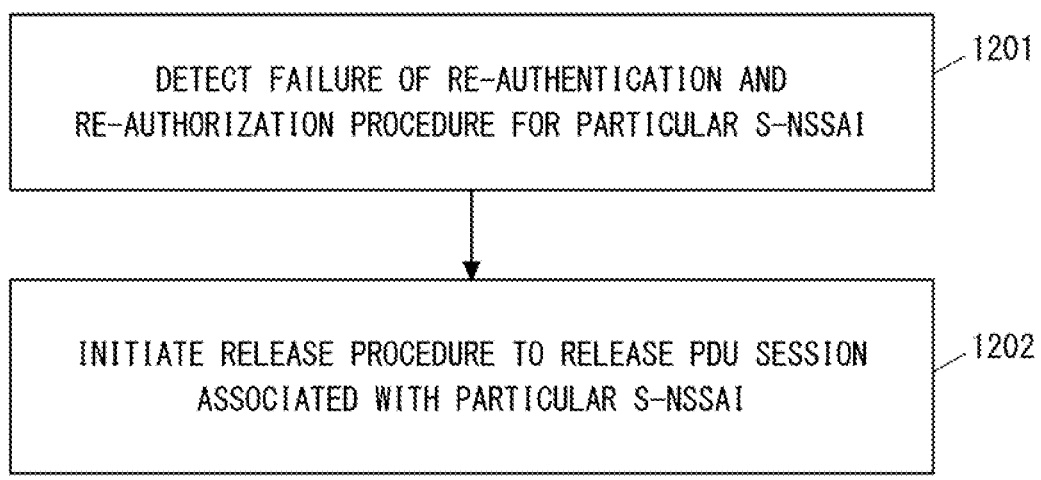
FIG. 12 is a flowchart showing an example of operation of an AMF according to an embodiment.

FIG. 12 is a flowchart showing an example of the operation of the AMF 2. In step 1201, the AMF 2 detects (or recognizes) a failure of a re-authentication and re-authorization procedure (NSSAA procedure) for a particular S-NS- SAI. The AMF 2 may detect a failure of the NSSAA procedure for re-authentication by receiving a notification from the AUSF 4 indicating a failure of the NSSAA procedure (EAP authentication). More specifically, the AMF 2 may determine whether it has received a message from the AUSF 4 indicating a failure of the EAP-based authentication procedure for the particular S-NSSAI. Additionally or alternatively, the AMF 2 may start a timer upon triggering a re-authentication and re-authorization procedure (NSSAA procedure) and determine that the re-authentication and re-authorization procedure has failed if that timer expires before the result (success or failure) of the re-authentication and re-authorization procedure is received from the AUSF 4.

In step 1202, in response to a failure of the re-authentication and re-authorization procedure for the particular S-NSSAI, the AMF 2 initiates a release procedure to release all the PDU sessions associated with that particular S-NSSAI. The AMF 2 may initiate a PDU session release procedure in response to the receipt of a message from the AUSF 4 indicating the failure of the EAP-based authentication procedure.

According to the PDU session release procedure described in section 4.3.4.2 of Non-Patent Literature 2, the AMF 2 may perform (or invoke) an Nsmf_PDUSession_UpdateSMContext (or Nsmf_PDUSession_ReleaseSMContext) service operation to release one or more PDU sessions associated with the particular S-NSSAI. More specifically, the AMF 2 may send a message (e.g., Nsmf_PDUSession_UpdateSMContext message) containing a Release Indication to the SMF 3. The AMF 2 may notify the SMF 3 of the PDU session IDs of one or more PDU sessions associated with that S-NSSAI in order to invoke a network-requested PDU session release procedure. The AMF 2 may include these PDU session IDs in the above message, or may inform the SMF 3 of these PDU session IDs by another message. The AMF 2 may include the particular S-NSSAI in the above message, or may notify the SMF 3 of the S-NSSAI by another message. Alternatively, the AMF 2 may send an Nsmf_PDUSession_ReleaseSMContext message to the SMF 3. The AMF 2 may include in the Nsmf_PDUSession_ReleaseSMContext message the PDU session IDs of one or more PDU sessions associated with that S-NSSAI. The AMF 2 may include the concerned S-NSSAI in the Nsmf_PDUSession_ReleaseSMContext message.

The AMF 2 may inform the SMF 3 of the failure of the re-authentication and re-authorization procedure (NSSAA procedure) for the particular S-NSSAI for the UE 1 in the PDU session release procedure. Specifically, the AMF 2 may send a message to the SMF 3 containing a cause IE indicating the failure of the re-authentication and re-authorization procedure (e.g., NSSAA failure). This message may be, for example, an Nsmf_PDUSession_UpdateSMContext message (or an Nsmf_PDUSession_ReleaseSMContext message).

The operation shown in FIG. 12 allows the AMF 2 to quickly release a PDU session associated with a network slice for which the re-authentication and re-authorization procedure has failed.

Figure 13:
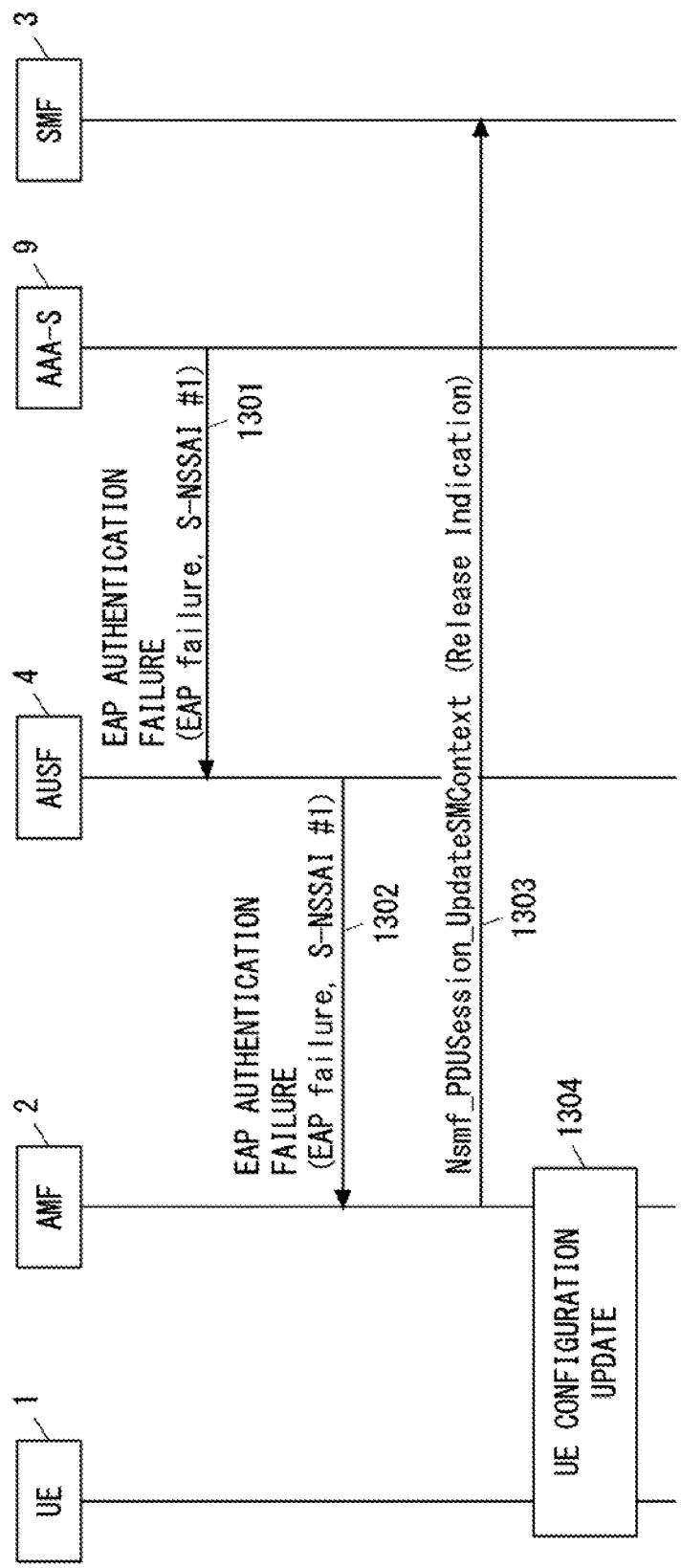
FIG. 13 is a sequence diagram showing an example of operations of a UE, an AMF and an AUSF according to an embodiment.

FIG. 13 shows an example of the operation of the UE 1, AMF 2, and SMF 3 when a re-authentication and re-authorization procedure for a network slice has failed. In step 1301, the AAA-S 9 informs the AUSF 4 of the failure of EAP authentication for a network slice identified by a particular S-NSSAI (in this case S-NSSAI #1). Specifically, the AAA-S 9 may send an AAA protocol message indicating an EAP authentication failure to the AUSF 4. The message indicates S-NSSAI #1 and EAP authentication failure and further indicates the GPSI of the UE 1. The message may be sent directly from the AAA-S 9 to the AUSF 4, or may be sent to the AUSF 4 via an AAA Proxy (AAA-P) not illustrated.

In step 1302, the AUSF 4 notifies the AMF 2 of the failure of the EAP authentication for S-NSSAI #1. Specifically, the AUSF 4 may send an Nausf_NSSAA_Authenticate Response message to the AMF 2. The message indicates S-NSSAI #1 and EAP authentication failure and further indicates the GPSI of the UE 1.

In step 1303, if there are PDU sessions of the UE 1 associated with S-NSSAI #1 for which the re-authentication failed, the AMF 2 performs (or invokes) a procedure to release all the PDU sessions of the UE 1 associated with S-NSSAI #1, such as an Nsmf_PDUSession_UpdateSMContext (or Nsmf_PDUSession_ReleaseSMContext) service operation. In this procedure, the AMF 2 sends a message (e.g., Nsmf_PDUSession_UpdateSMContext message) containing a Release Indication to the SMF 3. The AMF 2 may notify the SMF 3 of the PDU session IDs of one or more PDU sessions associated with S-NSSAI #1 in order to invoke a network-requested PDU session release procedure. The AMF 2 may include these PDU session IDs in the above message, or may inform the SMF 3 of these PDU session IDs by another message. The AMF 2 may include S-NSSAI #1 in the above message, or may notify the SMF 3 of S-NSSAI #1 by another message. Alternatively, the AMF 2 may send an Nsmf_PDUSession_ReleaseSMContext message to the SMF 3. The AMF 2 may include in the Nsmf_PDUSession_ReleaseSMContext message the PDU session IDs of one or more PDU sessions associated with S-NSSAI #1. The AMF 2 may include S-NSSAI #1 in the Nsmf_PDUSession_ReleaseSMContext message. As mentioned above, the message may contain a cause IE indicating a failure of the re-authentication and re-authorization procedure (e.g., NSSAA failure).

In step 1304, the AMF 2 signals the UE 1 to update the UE NSSAI configuration (NSSAI storage) to remove S-NSSAI #1, for which the reauthentication failed, from the Allowed NSSAI (or Pending NSSAI). Specifically, the AMF 2 sends to the UE 1 a UE Configuration Update Command message indicating that S-NSSAI #1 is to be removed from the Allowed NSSAI (or Pending NSSAI) and that this is to be included in the Rejected NSSAI. In response to the reception of the UE Configuration Update Command message, the UE 1 updates its UE NSSAI configuration (NSSAI storage) stored in a (non-volatile) memory of the UE 1. Specifically, the UE 1 removes S-NSSAI #1 from the Allowed NSSAI (or Pending NSSAI) in the UE NSSAI configuration (NSSAI storage) and stores it in the Rejected NSSAI. The UE Configuration Update Command message may contain a cause IE indicating a failure of a re-authentication and re-authorization procedure (e.g., NSSAA failure). In other words, S-NSSAI #1 in the relevant UE Configuration Update Command message may be associated with a Cause IE indicating a failure of a re-authentication and re-authorization procedure. The cause IE may be, for example, "S-NSSAI is not available due to the failed or revoked network slice-specific authorization and authentication".

The procedure in FIG. 13 may be modified as appropriate. For example, the AMF 2 may request the SMF 3 to release a PDU session after the UE Configuration Update procedure (step 1304).

Figure 14:
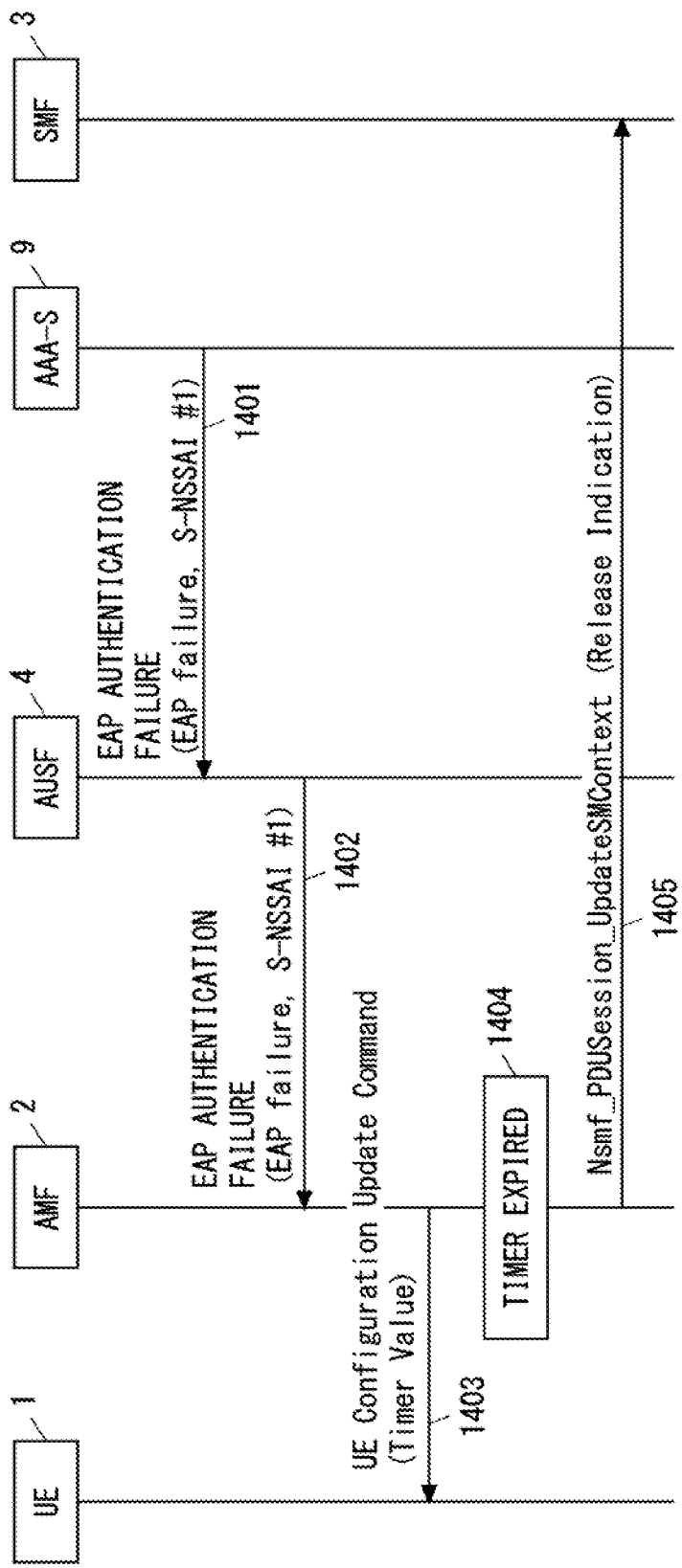
FIG. 14 is a sequence diagram showing an example of operations of a UE, an AMF and an AUSF according to an embodiment.

FIG. 14 shows another example of the operation of the UE 1, AMF 2, and SMF 3 when a re-authentication and re-authorization procedure for a network slice has failed. In FIG. 14, the AMF 2 requests the SMF 3 for PDU session release (step 1405) after a UE Configuration Update procedure (step 1403).

Steps 1401 and 1402 in FIG. 14 are similar to steps 1301 and 1302 in FIG. 13. In step 1403, the AMF 2 performs a UE Configuration Update procedure in order to remove S-NSSAI #1, for which the re-authentication failed, from the Allowed NSSAI (or Pending NSSAI). In the UE Configuration Update procedure, the AMF 2 sends to the UE 1 a UE Configuration Update Command message indicating that S-NSSAI #1 is to be removed from the Allowed NSSAI (or Pending NSSAI) and that this is to be included in the Rejected NSSAI. The UE Configuration Update Command message may contain a cause IE indicating a failure of a re-authentication and re-authorization procedure (e.g., NSSAA failure). In other words, S-NSSAI #1 in the relevant UE Configuration Update Command message may be associated with a Cause IE indicating a failure of a re-authentication and re-authorization procedure. The cause IE may be, for example, "S-NSSAI is not available due to the failed or revoked network slice-specific authorization and authentication".

If there are one or more PDU sessions of the UE 1 associated with S-NSSAI #1, the AMF 2 includes in the UE Configuration Update Command message an information element indicating a grace period before these PDU sessions are released. This information element may be the value of a timer that is used to determine the expiration of the grace period. The AMF 2 may start the timer upon being triggered by the transmission of the UE Configuration Update Command message. Alternatively, the AMF 2 may start the timer upon being triggered by the reception of a response message to the UE Configuration Update Command message (e.g., a UE Configuration Update Complete message).

If the timer for measuring the grace period has expired (step 1404), the AMF 2 invokes an Nsmf_PDUSession_UpdateSMContext (or Nsmf_PDUSession_ReleaseSMContext) service operation to release all the PDU sessions of the UE 1 associated with S-NSSAI #1 (step 1405). More specifically, the AMF 2 sends an Nsmf_PDUSession_UpdateSMContext message (or an Nsmf_PDUSession_ReleaseSMContext message) to the SMF 3. As mentioned above, this message may contain a cause IE indicating a failure of a re-authentication and re-authorization procedure (e.g., NSSAA failure). If the AMF 2 receives from the UE 1 the start of the procedure to release the PDU session before the timer for measuring the grace period expires, it may stop the timer and terminate the network-requested PDU session release procedure.

The procedure in FIG. 14 allows the AMF 2 to inform the UE 1 that PDU sessions associated with the network slice whose authorization has been revoked will be released after a grace period has elapsed.

Figure 15:
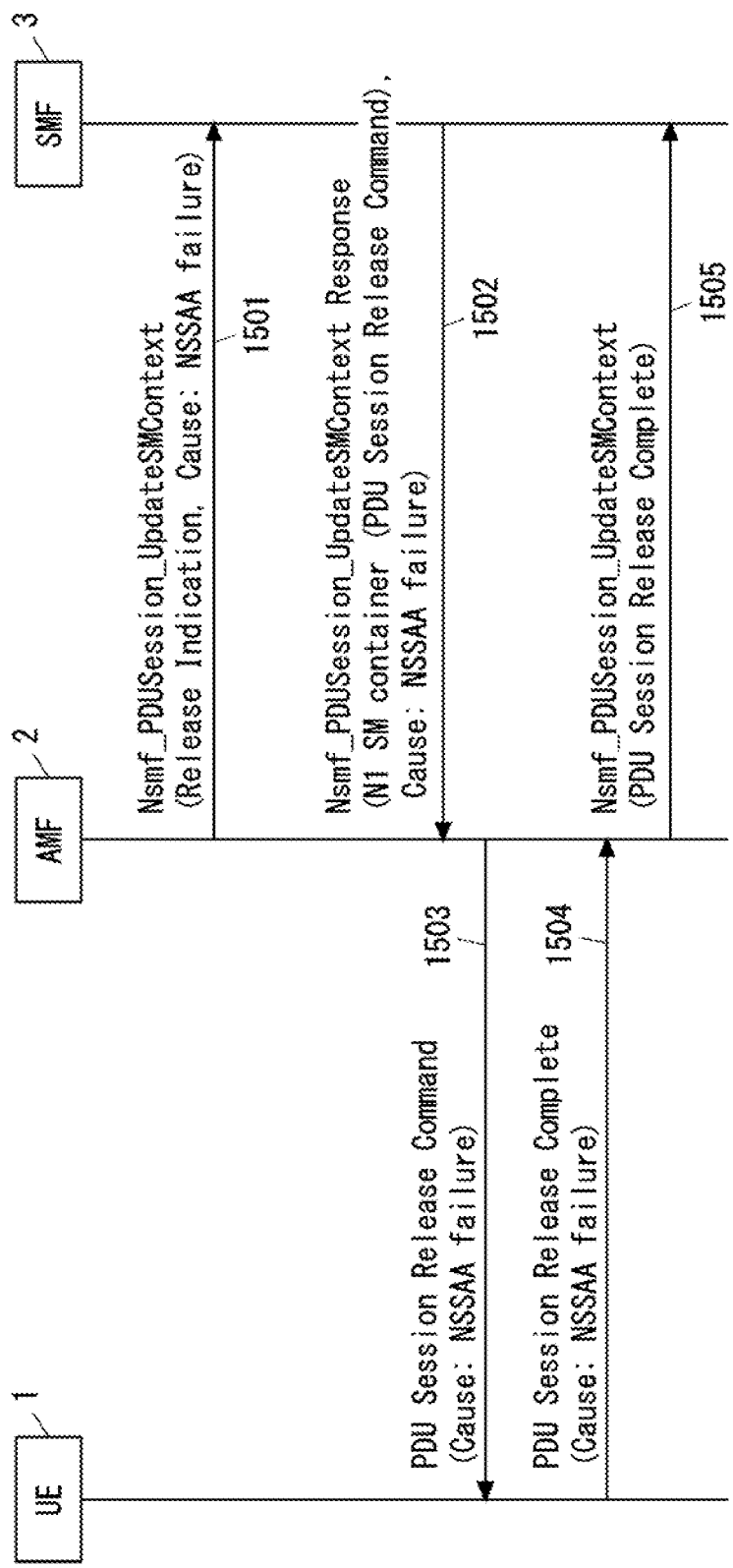
FIG. 15 is a sequence diagram showing an example of operations of a UE, an AMF and an SMF according to an embodiment.

FIG. 15 shows an example of the PDU session release procedure. In step 1501, the AMF 2 sends a message (e.g., Nsmf_PDUSession_UpdateSMContext message, or Nsmf_PDUSession_ReleaseSMContext message) to the SMF 3 to request the release of a PDU session associated with a network slice (S-NSSAI) whose reauthentication has failed. This message contains a Release Indication and a cause IE indicating a failure of a re-authentication and re-authorization procedure (e.g., NSSAA failure). The AMF 2 may inform the SMF 3 of the PDU session IDs of one or more PDU sessions associated with that S-NSSAI in order to invoke the network-requested PDU session release procedure. The AMF 2 may include these PDU session IDs in the above message, or may notify these PDU session IDs to the SMF 3 by a separate message. The AMF 2 may include the S-NSSAI in the above message, or may notify the SMF 3 of the S-NSSAI by a separate message. Step 1501 corresponds to step 1303 in FIG. 13 or step 1405 in FIG. 14.

In step 1502, the SMF 3 sends a response message to the AMF 2. For example, the SMF 3 may respond to the AMF 2 with an Nsmf_PDUSession_UpdateSMContext Response message or an Nsmf_PDUSession_ReleaseSMContext Response message. This message contains an N1 SM container containing a PDU Session Release Command. The message may also contain a cause IE indicating a failure of a re-authentication and re-authorization procedure (e.g., NSSAA failure). Additionally or alternatively, the PDU Session Release Command may contain a 5GSM Cause IE indicating a failure of a re-authentication and re-authorization procedure (e.g., NSSAA failure) (or that the S-NSSAI is not available).

In step 1503, the AMF 2 sends a NAS message including the N1 SM container containing the PDU Session Release Command to the UE 1 via the AN 5. The PDU Session Release Command may contain a 5GSM Cause IE indicating a failure of a re-authentication and re-authorization procedure (e.g. NSSAA failure) (or that the S-NSSAI is not available).

In step 1504, the UE 1 sends a NAS message containing a PDU Session Release Complete to the AMF 2 in order to acknowledge the PDU Session Release Command. The PDU Session Release Complete may contain a 5GSM Cause IE indicating a failure of a re-authentication and re-authorization procedure (e.g., NSSAA failure).

In step 1505, the AMF 2 performs (or invokes) an Nsmf_PDUSession_UpdateSMContext service operation and forwards the N1 SM container (PDU Session Release Complete) to the SMF 3.

Fifth Embodiment

A configuration example of a cellular network for this embodiment may be the same as the example shown in FIG. 1. This embodiment provides another example of the operation of the AMF 2 when re-authentication and re-authorization of a network slice has failed.

Figure 16:
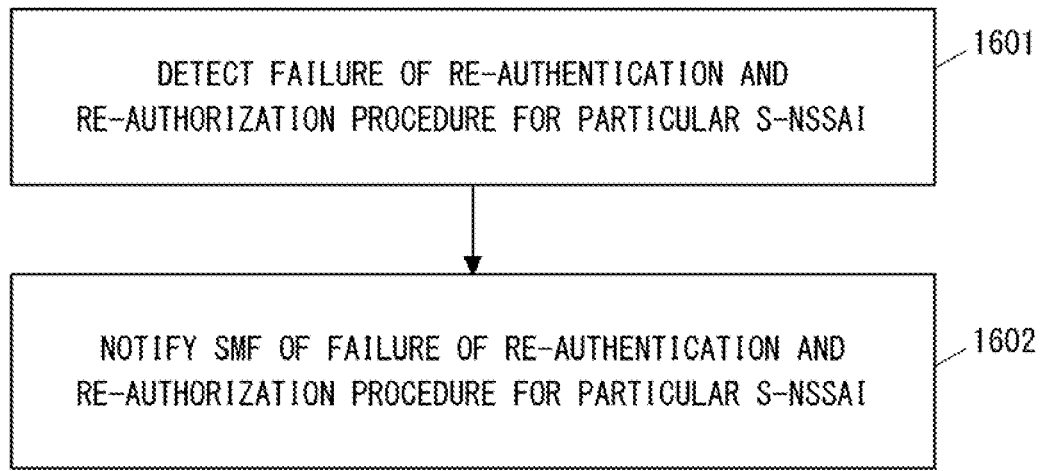
FIG. 16 is a flowchart showing an example of operation of an AMF according to an embodiment.

FIG. 16 is a flowchart showing an example of the operation of the AMF 2. Step 1601 is similar to step 1201 in FIG. 12. That is, the AMF 2 detects a failure of the re-authentication and re-authorization procedure (NSSAA procedure) for a particular S-NSSAI. In step 1602, the AMF 2 notifies the SMF 3 of the failure of the re-authentication and re-authorization procedure for the particular S-NSSAI. If the SMF receives the notification message (step 1602) from the AMF 2, the SMF 3 decides to release the PDU session(s) associated with that particular S-NSSAI.

The operation shown in FIG. 16 allows the AMF 2 to notify the SMF 3 of a failure of the re-authentication and re-authorization procedure for a particular S-NSSAI, and thereby assist the SMF 3 to release the PDU session(s) associated with the particular S-NSSAI (or the network slice identified by it) for which the re-authentication failed.

Sixth Embodiment

A configuration example of a cellular network for this embodiment may be the same as the example shown in FIG. 1. This embodiment provides an example of the operation of the UE 1 when re-authentication and re-authorization of a network slice has failed.

Figure 17:
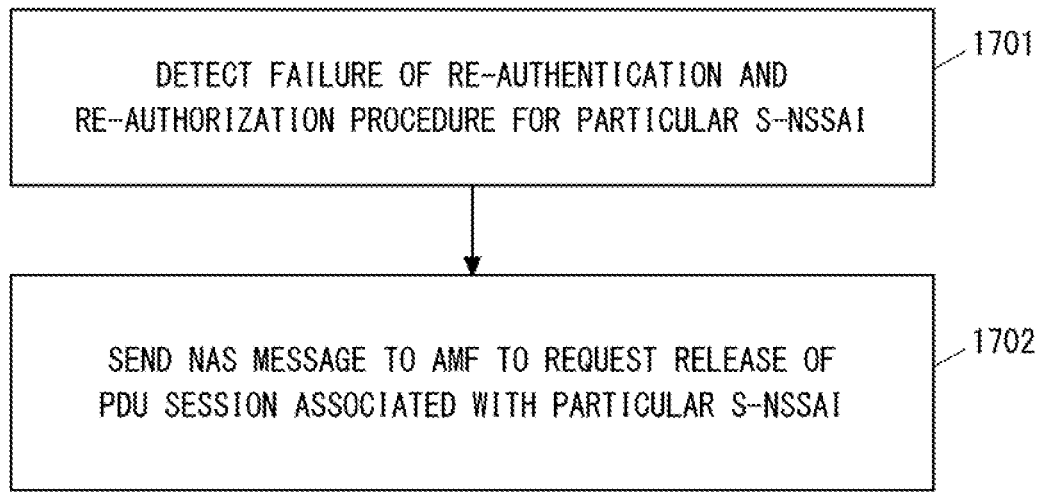
FIG. 17 is a flowchart showing an example of operation of a UE according to an embodiment.

FIG. 17 is a flowchart showing an example of the operation of the UE 1. In step 1701, the UE 1 detects (or recognizes) a failure of a re-authentication and re-authorization procedure for a particular S-NSSAI. For example, if the UE 1 receives a UE Configuration Update Command message from the AMF 2 indicating that a particular S-NSSAI is to be removed from the Allowed NSSAI (or Pending NSSAI) and is to be included in the Rejected NSSAI, then the UE 1 may detect (or recognize) a failure of a re-authentication and re-authorization procedure for that particular S-NSSAI. Additionally or alternatively, if the UE 1 receives from the AMF 2 a NAS message that contains an information element indicating a failure of re-authentication for a particular S-NSSAI, it may detect (or recognize) a failure of the re-authentication and re-authorization procedure for that particular S-NSSAI.

In step 1702, in response to the failure of the re-authentication of the particular S-NSSAI for the UE 1, the UE 1 requests the network to release a PDU session(s) associated with the particular S-NSSAI. Specifically, the UE 1 sends a NAS message to the AMF 2 to request the release of a PDU session(s) associated with that particular S-NSSAI. More specifically, the NAS-MM layer of the UE 1 notifies the NAS-SM layer of the UE 1 of the failure of the re-authentication of the particular S-NSSAI. The NAS-SM layer of the UE 1 generates a PDU Session Release Request for a PDU session associated with the particular S-NSSAI for which the re-authentication failed, in response to the notification from the lower layer (NAS-MM layer). The NAS-SM layer of the UE 1 passes the generated PDU Session Release Request together with the PDU Session ID to the NAS-MM layer. The NAS-MM layer of the UE 1 sends a NAS message (e.g., UL NAS Transport message) containing the PDU Session ID and the N1 SM container (PDU Session Release Request) to the AMF 2. One or both of the NAS message and the PDU Session Release Request may contain a cause information element indicating the cancellation of the failure of the re-authentication and re-authorization procedure.

The operation shown in FIG. 17 allows the UE 1 to quickly release a PDU session(s) associated with a network slice for which re-authentication has failed.

Figure 18:
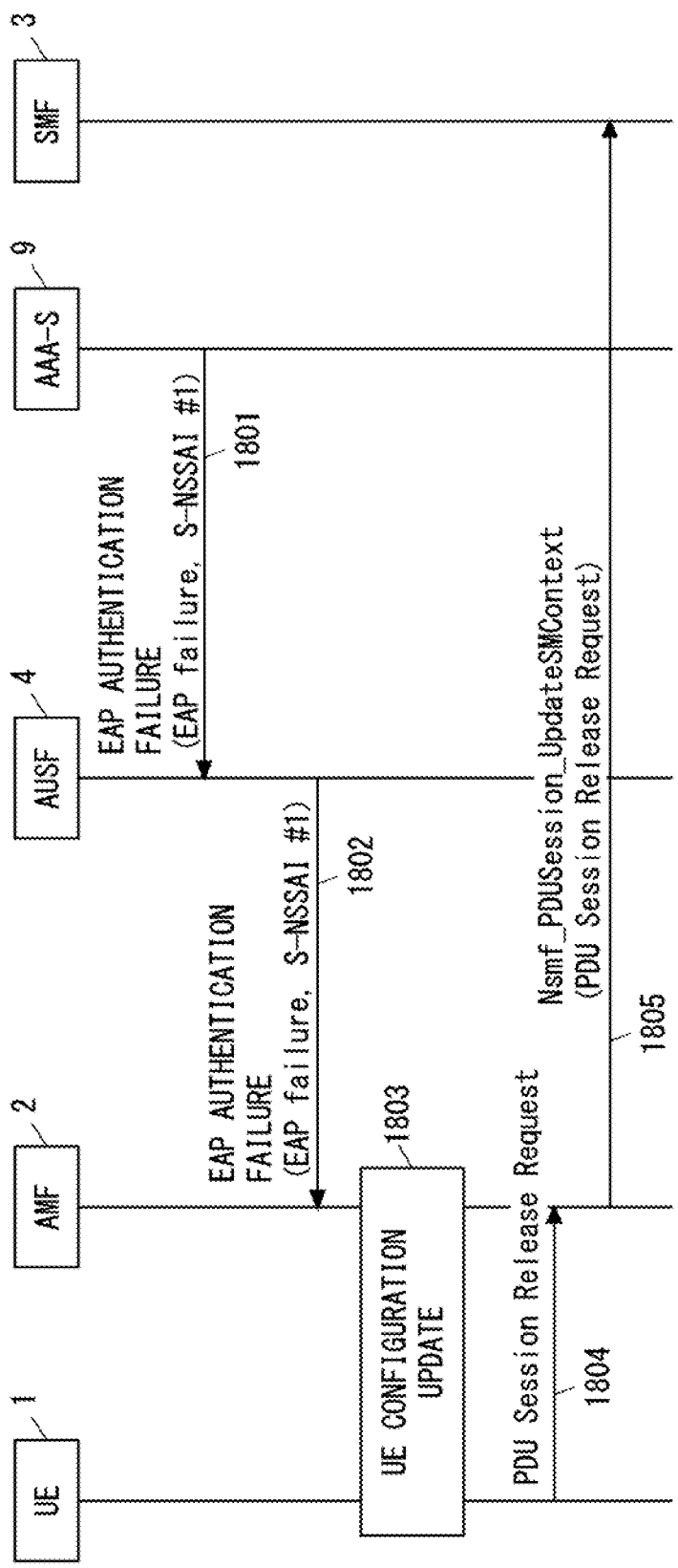
FIG. 18 is a sequence diagram showing an example of operations of a UE, an AMF and an AUSF according to an embodiment.

FIG. 18 shows an example of the operation of the UE 1, AMF 2, and SMF 3 when a re-authentication and re-authorization procedure for a network slice has failed. Steps 1801 and 1802 are similar to steps 1301 and 1302 in FIG. 13. That is, the AAA-S 9 informs the AMF 2 via the AUSF 4 of a failure of EAP authentication for a particular S-NSSAI (in this case S-NSSAI #1).

In step 1803, the AMF 2 signals the UE 1 to update the UE NSSAI configuration (NSSAI storage) to remove S-NSSAI #1, for which the reauthentication failed, from the Allowed NSSAI (or Pending NSSAI). Specifically, the AMF 2 sends to the UE 1 a UE Configuration Update Command message indicating that S-NSSAI #1 is to be removed from the Allowed NSSAI (or Pending NSSAI) and that this is to be included in the Rejected NSSAI. In response to the reception of the UE Configuration Update Command message, the UE 1 updates its UE NSSAI configuration (NSSAI storage) stored in a (non-volatile) memory of the UE 1. Specifically, the UE 1 removes S-NSSAI #1 from the Allowed NSSAI (or Pending NSSAI) in the UE NSSAI configuration (NSSAI storage) and stores it in the Rejected NSSAI. The UE Configuration Update Command message may contain a cause IE indicating a failure of a re-authentication and re-authorization procedure. In other words, the particular S-NSSAI in the relevant UE Configuration Update Command message may be associated with a Cause IE indicating a failure of a re-authentication and re-authorization procedure. The cause IE may be, for example, "5-NSSAI is not available due to the failed or revoked network slice-specific authorization and authentication".

In step 1804, in response to detecting the failure of the re-authentication for S-NSSAI #1, the UE 1 requests the network to release a PDU session(s) associated with S-NSSAI #1. Specifically, the UE 1 sends to the AMF 2 a NAS message containing the PDU Session ID(s) of the PDU session(s) associated with SNSSAI #1 and an N1 SM container (PDU Session Release Request). As mentioned above, one or both of the NAS message and the PDU Session Release Request may contain a cause IE indicating a failure of a re-authentication and re-authorization procedure.

In step 1805, the AMF 2 invokes an Nsmf_PDUSession_UpdateSMContext service operation and forwards the N1 SM container (PDU Session Release Request) to the SMF 3.

Figure 19:
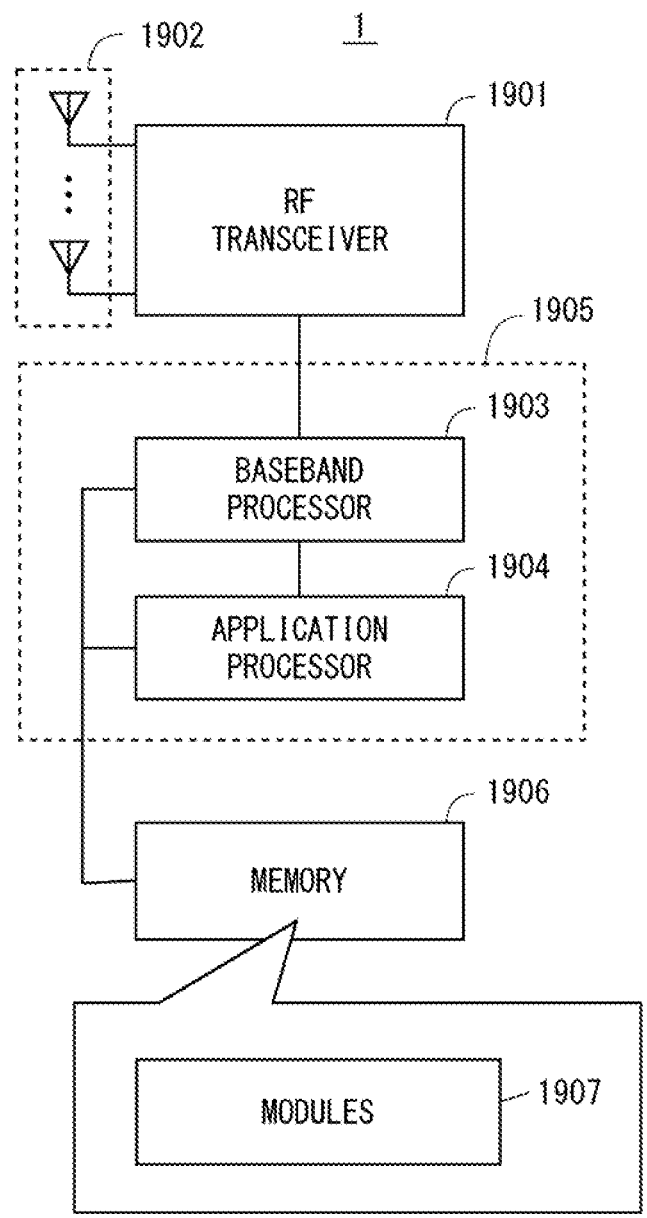
FIG. 19 is a block diagram showing a configuration example of a UE according to an embodiment.

The following provides configuration examples of the UE 1, AMF 2, and SMF 3 according to the above-described embodiments. FIG. 19 is a block diagram showing a configuration example of the UE 1. A Radio Frequency (RF) transceiver 1901 performs analog RF signal processing to communicate with NG-RAN nodes. The RF transceiver 1901 may include a plurality of transceivers. The analog RF signal processing performed by the RF transceiver 1901 includes frequency up-conversion, frequency down-conversion, and amplification. The RF transceiver 1901 is coupled to an antenna array 1902 and a baseband processor 1903. The RF transceiver 1901 receives modulated symbol data (or OFDM symbol data) from the baseband processor 1903, generates a transmission RF signal, and supplies the transmission RF signal to the antenna array 1902. Further, the RF transceiver 1901 generates a baseband reception signal based on a reception RF signal received by the antenna array 1902 and supplies the baseband reception signal to the baseband processor 1903. The RF transceiver 1901 may include an analog beamformer circuit for beam forming. The analog beamformer circuit includes, for example, a plurality of phase shifters and a plurality of power amplifiers.

The baseband processor 1903 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1903 may include, for example, signal processing of a Service Data Adaptation Protocol (SDAP) layer, a Packet Data Convergence Protocol (PDCP) layer, a Radio Link Control (RLC) layer, a Medium Access Control (MAC) layer, and a Physical (PHY) layer. Further, the control-plane processing performed by the baseband processor 1903 may include processing of Non-Access Stratum (NAS) protocols, Radio Resource Control (RRC) protocols, and MAC Control Elements (CEs).

The baseband processor 1903 may perform Multiple Input Multiple Output (MIMO) encoding and pre-coding for beam forming.

The baseband processor 1903 may include a modem processor (e.g., Digital Signal Processor (DSP)) that performs the digital baseband signal processing and a protocol stack processor (e.g., a Central Processing Unit (CPU) or a Micro Processing Unit (MPU)) that performs the control-plane processing. In this case, the protocol stack processor, which performs the control-plane processing, may be integrated with an application processor 1904 described in the following.

The application processor 1904 is also referred to as a CPU, an MPU, a microprocessor, or a processor core. The application processor 1904 may include a plurality of processors (or processor cores). The application processor 1904 loads a system software program (Operating System (OS)) and various application programs (e.g., a call application, a WEB browser, a mailer, a camera operation application, and a music player application) from a memory 1906 or from another memory (not illustrated) and executes these programs, thereby providing various functions of the UE 1.

In some implementations, as represented by a dashed line (1905) in FIG. 19, the baseband processor 1903 and the application processor 1904 may be integrated on a single chip. In other words, the baseband processor 1903 and the application processor 1904 may be implemented in a single System on Chip (SoC) device 1905. An SoC device may be referred to as a Large-Scale Integration (LSI) or a chipset.

The memory 1906 is a volatile memory, a non-volatile memory, or a combination thereof. The memory 1906 may include a plurality of memory devices that are physically independent from each other. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1906 may include, for example, an external memory device that can be accessed from the baseband processor 1903, the application processor 1904, and the SoC 1905. The memory 1906 may include an internal memory device that is integrated in the baseband processor 1903, the application processor 1904, or the SoC 1905. Further, the memory 1906 may include a memory in a Universal Integrated Circuit Card (UICC).

The memory 1906 may store one or more software modules (computer programs) 1907 including instructions and data to perform the processing by the UE 1 described in the above embodiments. In some implementations, the baseband processor 1903 or the application processor 1904 may load these software modules 1907 from the memory 1906 and execute the loaded software modules, thereby performing the processing of the UE 1 described in the above embodiments with reference to the drawings.

The control-plane processing and operations performed by the UE 1 described in the above embodiments can be achieved by elements other than the RF transceiver 1901 and the antenna array 1902, i.e., achieved by the memory 1906, which stores the software modules 1907, and one or both of the baseband processor 1903 and the application processor 1904.

Figure 20:
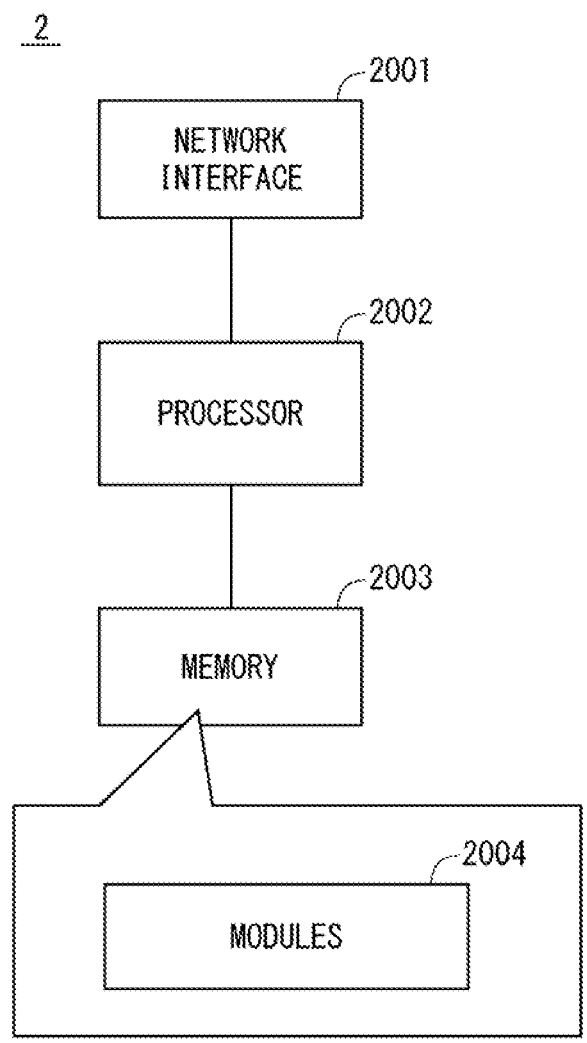
FIG. 20 is a block diagram showing a configuration example of an AMF according to an embodiment.

FIG. 20 shows a configuration example of the AMF 2. The SMF 3 may also be configured as shown in FIG. 20. Referring to FIG. 20, the AMF 2 includes a network interface 2001, a processor 2002, and a memory 2003. The network interface 2001 is used to communicate, for example, with RAN nodes and with other network functions (NFs) or nodes in the 5GC. The other NFs or nodes in the 5GC include, for example, UDM, AUSF, SMF, and PCF. The network interface 2001 may include, for example, a network interface card (NIC) conforming to the IEEE 802.3 series.

The processor 2002 may be, for example, a microprocessor, a Micro Processing Unit (MPU), or a Central Processing Unit (CPU). The processor 2002 may include a plurality of processors.

The memory 2003 is composed of a volatile memory and a nonvolatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 2003 may include a storage located apart from the processor 2002. In this case, the processor 2002 may access the memory 2003 via the network interface 2001 or an I/O interface (not illustrated).

The memory 2003 may store one or more software modules (computer programs) 2004 including instructions and data to perform the processing of the AMF 2 described in the above embodiments. In some implementations, the processor 2002 may be configured to load the one or more software modules 2004 from the memory 2003 and execute the loaded software modules, thereby performing the processing of the AMF 2 described in the above embodiments.

As described above with reference to FIGS. 19 and 20, each of the processors that the UE 1, AMF 2 and SMF 3 according to the above embodiments include executes one or more programs including instructions for causing a computer to execute an algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

The User Equipment (UE) in the present disclosure is an entity to be connected to a network via a wireless interface. It should be noted that the radio terminal (UE) in the present disclosure is not limited to a dedicated communication device, and it may be any device as follows having the communication functions herein explained.

The terms "User Equipment (UE)" (as the term is used by 3GPP), "mobile station", "mobile terminal", "mobile device", and "radio terminal (wireless device)" are generally intended to be synonymous with one another. The UE may include standalone mobile stations, such as terminals, cell phones, smartphones, tablets, cellular IoT (internet of things) terminals, and IoT devices. It will be appreciated that the terms "UE" and "radio terminal" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper projecting machinery; chemical machinery; mining and/or construction machinery and/or related equipment; machinery and/or implements for agriculture, forestry and/or fisheries; safety and/or environment preservation equipment; tractors; bearings; precision bearings; chains; gears; power transmission equipment; lubricators; valves; pipe fittings; and/or application systems for any of the previously mentioned equipment or machinery etc.).

A UE may, for example, be an item of transport equipment (for example transport equipment such as: rolling stocks; motor vehicles; motorcycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be an item of refrigeration equipment, a refrigeration application product and equipment, trade and/or service industry equipment, a vending machine, an automatic service machine, an office machine or equipment, a consumer electronic and electronic appliance (for example a consumer electronic appliance such as: audio equipment; a speaker; a radio; video equipment; a television; an oven range; a rice cooker; a coffee maker; a dishwasher; a washing machine; dryers, a fan, an exhaust fan and related products, a vacuum cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies. Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g., vehicles) or attached to animals or persons to be monitored/tracked. It will be appreciated that IoT technology can be implemented on any communication devices that can connect to a communications network for sending/receiving data, regardless of whether such communication devices are controlled by human input or software instructions stored in memory. It will be appreciated that IoT devices are sometimes also referred to as Machine-Type Communication (MTC) devices, Machine-to-Machine (M2M) communication devices, or Narrow Band-IoT (NB-IoT) UE.

It will be appreciated that a UE may support one or more IoT or MTC applications.

Some examples of MTC applications are listed in 3GPP TS 22.368 V13.2.0 (2017 Jan. 13), Annex B (the contents of which are incorporated herein by reference). This list is not exhaustive and is intended to be indicative of some examples of MTC applications. In this list, the Service Area of the MTC applications includes Security, Tracking & Tracing, Payment, Health, Remote Maintenance/Control, Metering, and Consumer Devices.

Examples of the MTC applications regarding Security include Surveillance systems, Backup for landline, Control of physical access (e.g., to buildings), and Car/driver security.

Examples of the MTC applications regarding Tacking & Tracing include Fleet Management, Order Management, Telematics insurance: Pay as you drive (PAYD), Asset Tracking, Navigation, Traffic information, Road tolling, and Road traffic optimisation/steering.

Examples of the MTC applications regarding Payment include Point of sales (POS), Vending machines, and Gaming machines.

Examples of the MTC applications regarding Health include Monitoring vital signs, Supporting the aged or handicapped, Web Access Telemedicine points, and Remote diagnostics.

Examples of the MTC applications regarding Remote Maintenance/Control include Sensors, Lighting, Pumps, Valves, Elevator control, Vending machine control, and Vehicle diagnostics.

Examples of the MTC applications regarding Metering include Power, Gas, Water, Heating, Grid control, and Industrial metering.

Examples of the MTC applications regarding Consumer Devices include Digital photo frame, Digital camera, and eBook.

Applications, services, and solutions may be an Mobile Virtual Network Operator (MVNO) service/system, an emergency radio communication service/system, a Private Branch eXchange (PBX) service/system, a PHS/Digital Cordless Telecommunications service/system, a Point of sale (POS) service/system, an advertise calling service/system, a Multimedia Broadcast and Multicast Service (MBMS) service/system, a Vehicle to Everything (V2X) service/system, a train radio service/system, a location related service/system, a Disaster/Emergency Wireless Communication Service/system, an Internet of Things (IoT) service/system, a community service/system, a video streaming service/system, a femto cell application service/system, a Voice over LTE (VoLTE) service/system, a radio tag service/system, a charging service/system, a radio on demand service/system, a roaming service/system, an activity monitoring service/system, a telecom carrier/communication NW selection service/system, a functional restriction service/system, a Proof of Concept (PoC) service/system, a personal information management service/system, a display video service/system, a non-communication service/system, an ad-hoc network/Delay Tolerant Networking (DTN) service/system, etc.

The above-described UE categories are merely examples of applications of the technical ideas and embodiments described in the present disclosure. The UE described in this disclosure is not limited to these examples and various modifications can be made thereto by those skilled in the art.

The above-described embodiments are merely examples of applications of the technical ideas obtained by the inventors. These technical ideas are not limited to the above-described embodiments and various modifications can be made thereto.

The whole or part of the embodiments disclosed above can be described as, but not limited to, the following supplementary notes.

(Supplementary Note A1)
A User Equipment (UE) comprising:
at least one memory; and
at least one processor coupled to the at least one memory, wherein the at least one processor is configured to manage a UE configuration,
wherein the UE configuration includes
a) a set of allowed network slice identifiers indicating one or more network slice identifiers currently allowed to the UE, and
b) a set of pending network slice identifiers indicating one or more network slice identifiers for which Network Slice-Specific Authentication and Authorization (NSSAA) procedures are pending, and
wherein the at least one processor is configured to remove a first network slice identifier currently allowed to the UE from the set of allowed network slice identifiers and store the first network slice identifier in the set of pending network slice identifiers, in response to receiving a first Non-Access Stratum (NAS) message from an Access and Mobility Management Function (AMF).

(Supplementary Note A2)
The UE according to Supplementary Note A1, wherein the first NAS message is a UE CONFIGURATION UPDATE COMMAND message that explicitly indicates an update of the UE configuration with respect to the first network slice identifier.

(Supplementary Note A3)
The UE according to Supplementary Note A1, wherein the first NAS message is a message sent to the UE during a re-authentication and re-authorization procedure for the first network slice identifier.

(Supplementary Note A4)
The UE according to Supplementary Note A1, wherein the first NAS message is a message sent by the AMF when the AMF receives a request for establishment of a new session associated with the first network slice identifier from the UE while a re-authentication and re-authorization procedure for the first network slice identifier is ongoing.

(Supplementary Note A5)
The UE according to Supplementary Note A4, wherein the first NAS message indicates rejection of the request and contains a cause information element that indicates that the re-authentication and re-authorization procedures is ongoing.

(Supplementary Note A6)
The UE according to any one of Supplementary Notes A1 to A5, wherein
the UE configuration further includes c) a set of rejected network slice identifiers indicating one or more network slice identifiers that have been rejected by the AMF and are thereby not available to the UE,
the at least one processor is configured to receive from the AMF a second NAS message indicating that the first network slice identifier is to be removed from the set of pending network slice identifiers and stored in the set of rejected network slice identifiers, and
the at least one processor is configured to, in response to receiving the second NAS message, remove the first network slice identifier from the set of pending network slice identifiers and store the first network slice identifier in the set of rejected network slice identifiers.

(Supplementary Note A7)
The UE according to any one of Supplementary Notes A1 to A6, wherein
the first network slice identifier is a Single Network Slice Selection Assistance Information (S-NSSAI),
the set of allowed network slice identifiers is an Allowed Network Slice Selection Assistance Information (NSSAI) indicating one or more S-NSSAIs currently allowed to the UE, and
the set of pending network slice identifiers is a Pending NSSAI indicating one or more S-NSSAIs for which the NSSAA is pending.

(Supplementary Note A8)
A method in a User Equipment (UE), the method comprising:
managing a UE configuration,
wherein the UE configuration includes
a) a set of allowed network slice identifiers indicating one or more network slice identifiers currently allowed to the UE, and
b) a set of pending network slice identifiers indicating one or more network slice identifiers for which Network Slice-Specific Authentication and Authorization (NSSAA) procedures are pending; and
removing a first network slice identifier currently allowed to the UE from the set of allowed network slice identifiers and storing the first network slice identifier in the set of pending network slice identifiers, in response to receiving a first Non-Access Stratum (NAS) message from an Access and Mobility Management Function (AMF).

(Supplementary Note A9)
A program for causing a computer to perform a method in a User Equipment (UE), the method comprising:
managing a UE configuration,
wherein the UE configuration includes
a) a set of allowed network slice identifiers indicating one or more network slice identifiers currently allowed to the UE, and
b) a set of pending network slice identifiers indicating one or more network slice identifiers for which Network Slice-Specific Authentication and Authorization (NSSAA) procedures are pending; and
removing a first network slice identifier currently allowed to the UE from the set of allowed network slice identifiers and storing the first network slice identifier in the set of pending network slice identifiers, in response to receiving a first Non-Access Stratum (NAS) message from an Access and Mobility Management Function (AMF).

(Supplementary Note A10)

An Access and Mobility Management Function (AMF) node comprising:
　at least one memory; and
　at least one processor coupled to the at least one memory and configured to send to a User Equipment (UE) a first Non-Access Stratum (NAS) message for causing the UE to update a UE configuration,
　wherein the UE configuration is stored by the UE and includes:
　　a) a set of allowed network slice identifiers indicating one or more network slice identifiers currently allowed to the UE; and
　　b) a set of pending network slice identifiers indicating one or more network slice identifiers for which Network Slice-Specific Authentication and Authorization (NSSAA) procedures are pending, and
　wherein the first NAS message causes the UE to remove a first network slice identifier currently allowed to the UE from the set of allowed network slice identifiers and store the first network slice identifier in the set of pending network slice identifiers.

(Supplementary Note A11)

The AMF node according to Supplementary Note A10, wherein the at least one processor is configured to send the first NAS message to the UE when triggering initiation of a re-authentication and re-authorization procedure for the first network slice identifier.

(Supplementary Note A12)

The AMF node according to Supplementary Note A10, wherein the at least one processor is configured to send the first NAS message to the UE when the AMF receives a request for establishment of a new session associated with the first network slice identifier from the UE after triggering the initiation of the re-authentication and re-authorization procedure for the first network slice identifier.

(Supplementary Note A13)

The AMF node according to any one of Supplementary Notes A10 to A12, wherein the first NAS message is a UE CONFIGURATION UPDATE COMMAND message that explicitly indicates an update of the UE configuration with respect to the first network slice identifier.

(Supplementary Note A14)

The AMF node according to Supplementary Note A11, wherein the first NAS message is a message sent to the UE during the re-authentication and re-authorization procedure.

(Supplementary Note A15)

The AMF node according to Supplementary Note A12, wherein the first NAS message indicates rejection of the request and contains a cause information element that indicates that the re-authentication and re-authorization procedures is ongoing.

(Supplementary Note A16)

The AMF node according to Supplementary Note A11 or A12, wherein
　the UE configuration further includes c) a set of rejected network slice identifiers indicating one or more network slice identifiers that have been rejected by the AMF node and are thereby not available to the UE,
　the at least one processor is configured to send to the UE a second NAS message for causing the UE to update the UE configuration, in response to a failure of the re-authentication and re-authorization procedure, and
　the second NAS message causes the UE to remove the first network slice identifier from the set of pending network slice identifiers and store the first network slice identifier in the set of rejected network slice identifiers.

(Supplementary Note A17)

The AMF node according to Supplementary Note A16, wherein
　the at least one processor is configured to, if an establishment procedure of a new session associated with the first network slice identifier is taking place or has been suspended, reject the establishment procedure, and
　the second NAS message indicates rejection of the establishment procedure and includes a cause information element indicating a failure of the re-authentication and re-authorization procedure.

(Supplementary Note A18)

The AMF node according to Supplementary Note A11, wherein the at least one processor is configured to trigger the initiation of the re-authentication and re-authorization procedure if a) an Authentication, Authorization and Accounting (AAA) server that allowed the first network slice identifier requests reauthentication, or b) the AMF node determines, based on operator policy or on changes in subscription information of the UE, that reauthentication for the first network slice identifier is required.

(Supplementary Note A19)

The AMF node according to any one of Supplementary Notes A10 to A18, wherein
　the first network slice identifier is a Single Network Slice Selection Assistance Information (S-NSSAI),
　the set of allowed network slice identifiers is an Allowed Network Slice Selection Assistance Information (NSSAI) indicating one or more S-NSSAIs currently allowed to the UE, and
　the set of pending network slice identifiers is a Pending NSSAI indicating one or more S-NSSAIs for which the NSSAA is pending.

(Supplementary Note A20)

A method in an Access and Mobility Management Function (AMF) node, the method comprising:
　sending to a User Equipment (UE) a first Non-Access Stratum (NAS) message for causing the UE to update a UE configuration,
　wherein the UE configuration is stored by the UE and includes:
　　a) a set of allowed network slice identifiers indicating one or more network slice identifiers currently allowed to the UE; and
　　b) a set of pending network slice identifiers indicating one or more network slice identifiers for which Network Slice-Specific Authentication and Authorization (NSSAA) procedures are pending, and
　wherein the first NAS message causes the UE to remove a first network slice identifier currently allowed to the UE from the set of allowed network slice identifiers and store the first network slice identifier in the set of pending network slice identifiers.

(Supplementary Note A21)

A program for causing a computer to perform a method in an Access and Mobility Management Function (AMF) node, the method comprising:
　sending to a User Equipment (UE) a first Non-Access Stratum (NAS) message for causing the UE to update a UE configuration, wherein the UE configuration is stored by the UE and includes:
a) a set of allowed network slice identifiers indicating one or more network slice identifiers currently allowed to the UE; and
b) a set of pending network slice identifiers indicating one or more network slice identifiers for which Network Slice-Specific Authentication and Authorization (NSSAA) procedures are pending, and wherein the first NAS message causes the UE to remove a first network slice identifier currently allowed to the UE from the set of allowed network slice identifiers and store the first network slice identifier in the set of pending network slice identifiers.

(Supplementary Note B1)

An Access and Mobility Management Function (AMF) node comprising:
at least one memory; and
at least one processor coupled to the at least one memory and configured to:
trigger initiation of a re-authentication and re-authorization procedure for a first network slice identifier currently allowed to a User Equipment (UE); and
if the at least one processor receives a request for establishment of a new session associated with the first network slice identifier from the UE after triggering the initiation of the re-authentication and re-authorization procedure, suspend a session establishment procedure triggered by the request until at least a result of the re-authentication and re-authorization is obtained.

(Supplementary Note B2)

The AMF node according to Supplementary Note B1, wherein the at least one processor is configured to, in response to receiving the request, send to the UE a Non-Access Stratum (NAS) message for causing the UE to update a UE configuration,
wherein the UE configuration is stored by the UE and includes:
a) a set of allowed network slice identifiers indicating one or more network slice identifiers currently allowed to the UE; and
b) a set of pending network slice identifiers indicating one or more network slice identifiers for which Network Slice-Specific Authentication and Authorization (NSSAA) procedures are pending, and
wherein the NAS message causes the UE to remove the first network slice identifier from the set of allowed network slice identifiers and store the first network slice identifier in the set of pending network slice identifiers.

(Supplementary Note B3)

The AMF node according to Supplementary Note B2, wherein the at least one processor is configured to send to the UE a rejection message indicating rejection of the request in response to a failure of the reauthentication and reauthorization procedure.

(Supplementary Note B4)

The AMF node according to Supplementary Note B3, wherein the at least one processor is configured to send a cause information element indicating the failure of the re-authentication and re-authorization procedure to the UE with the rejection message.

(Supplementary Note B5)

The AMF node according to Supplementary Note B3 or B4, wherein
the UE configuration further includes c) a set of rejected network slice identifiers indicating one or more network slice identifiers that have been rejected by the AMF node and are thereby not available to the UE, and
the rejection message causes the UE to remove the first network slice identifier from the set of pending network slice identifiers and store the first network slice identifier in the set of rejected network slice identifiers.

(Supplementary Note B6)

A method in an Access and Mobility Management Function (AMF) node, the method comprising:
triggering initiation of a re-authentication and re-authorization procedure for a first network slice identifier currently allowed to a User Equipment (UE); and
if the AMF node receives a request for establishment of a new session associated with the first network slice identifier from the UE after triggering the initiation of the re-authentication and re-authorization procedure, suspending a session establishment procedure triggered by the request until at least a result of the re-authentication and re-authorization is obtained.

(Supplementary Note B7)

A program for causing a computer to perform a method in an Access and Mobility Management Function (AMF) node, the method comprising:
triggering initiation of a re-authentication and re-authorization procedure for a first network slice identifier currently allowed to a User Equipment (UE); and
if the AMF node receives a request for establishment of a new session associated with the first network slice identifier from the UE after triggering the initiation of the re-authentication and re-authorization procedure, suspending a session establishment procedure triggered by the request until at least a result of the re-authentication and re-authorization is obtained.

(Supplementary Note B8)

An Access and Mobility Management Function (AMF) node comprising:
at least one memory; and
at least one processor coupled to the at least one memory and configured to:
trigger initiation of a re-authentication and re-authorization procedure for a first network slice identifier currently allowed to a User Equipment (UE); and
if the at least one processor receives a request for establishment of a new session associated with the first network slice identifier from the UE after triggering the initiation of the re-authentication and re-authorization procedure, reject the request.

(Supplementary Note B9)

The AMF node according to Supplementary Note B8, wherein the at least one processor is configured to send to the UE a Non-Access Stratum (NAS) message indicating rejection of the request, and
the NAS message includes a cause information element indicating that the re-authentication and re-authorization procedure is ongoing.

(Supplementary Note B10)

The AMF node according to Supplementary Note B9, wherein the NAS message causes the UE to update a UE configuration in such a manner that the first network slice identifier is removed from a set of allowed network slice identifiers indicating one or more network slice identifiers currently allowed to the UE and the first network slice identifier is stored in a set of pending network slice identifiers indicating one or more network slice identifiers for which Network Slice-Specific Authentication and Authorization (NSSAA) procedures are pending.

(Supplementary Note B11)

A method in an Access and Mobility Management Function (AMF) node, the method comprising:
- triggering initiation of a re-authentication and re-authorization procedure for a first network slice identifier currently allowed to a User Equipment (UE); and
- if the AMF node receives a request for establishment of a new session associated with the first network slice identifier from the UE after triggering the initiation of the re-authentication and re-authorization procedure, rejecting the request.

(Supplementary Note B12)

A program for causing a computer to perform a method in an Access and Mobility Management Function (AMF) node, the method comprising:
- triggering initiation of a re-authentication and re-authorization procedure for a first network slice identifier currently allowed to a User Equipment (UE); and
- if the AMF node receives a request for establishment of a new session associated with the first network slice identifier from the UE after triggering the initiation of the re-authentication and re-authorization procedure, rejecting the request.

(Supplementary Note C1)

An Access and Mobility Management Function (AMF) node comprising:
- at least one memory; and
- at least one processor coupled to the at least one memory and configured to:
  - in response to a failure of a re-authentication and re-authorization procedure for a first network slice identifier currently allowed to the UE, initiate a release procedure to release a Protocol Data Unit (PDU) session associated with the first network slice identifier.

(Supplementary Note C2)

The AMF node according to Supplementary Note C1, wherein the at least one processor is configured to notify a Session Management Function (SMF), in the release procedure, of the failure of the re-authentication and re-authorization for the first network slice identifier for the UE.

(Supplementary Note C3)

The AMF node according to Supplementary Note C2, wherein the at least one processor is configured to send a message to the SMF to request a release of a Session Management (SM) context for the PDU session in the release procedure, and
wherein the message contains a cause information element indicating the failure of the re-authentication and re-authorization.

(Supplementary Note C4)

The AMF node according to any one of Supplementary Notes C1 to C3, wherein the at least one processor is configured to, in response to the failure of the re-authentication and re-authorization, send to the UE a Non-Access Stratum (NAS) message for instructing an update of a UE configuration, wherein
the NAS message indicates that the first network slice identifier is to be included in a set of rejected network slice identifiers, and
the NAS message further indicates a grace period before the PDU session is released.

(Supplementary Note C5)

The AMF node according to Supplementary Note C4, wherein the at least one processor is configured to initiate the release procedure after the grace period has expired.

(Supplementary Note C6)

The AMF node according to any one of Supplementary Notes C1 to C5, wherein the at least one processor is configured to initiate the release procedure in response to receiving a message from an Authentication Server Function (AUSF) indicating a failure of the re-authentication and re-authorization.

(Supplementary Note C7)

The AMF node according to any one of Supplementary Notes C1 to C6, wherein the first network slice identifier is a Single Network Slice Selection Assistance Information (S-NSSAI).

(Supplementary Note C8)

A method in an Access and Mobility Management Function (AMF) node, the method comprising:
- in response to a failure of a re-authentication and re-authorization procedure for a first network slice identifier currently allowed to the UE, initiating a release procedure to release a Protocol Data Unit (PDU) session associated with the first network slice identifier.

(Supplementary Note C9)

A program for causing a computer to perform a method in an Access and Mobility Management Function (AMF) node, the method comprising:
- in response to a failure of a re-authentication and re-authorization procedure for a first network slice identifier currently allowed to the UE, initiating a release procedure to release a Protocol Data Unit (PDU) session associated with the first network slice identifier.

(Supplementary Note C10)

A User Equipment (UE) comprising:
- at least one memory; and
- at least one processor coupled to the at least one memory and configured to:
  - in response to a failure of a re-authentication and re-authorization procedure for a first network slice identifier currently allowed to the UE, request a network to release a Protocol Data Unit (PDU) session associated with the first network slice identifier.

(Supplementary Note C11)

The UE according to Supplementary Note C10, wherein the at least one processor is configured to send a first Non-Access Stratum (NAS) message to an Access and Mobility Management Function (AMF) to request a release of the PDU session, and
wherein the first NAS message includes a cause information element indicating the failure of the re-authentication and re-authorization.

(Supplementary Note C12)

The UE according to Supplementary Note C10 or C11, wherein
the at least one processor is configured to receive from an Access and Mobility Management Function (AMF) a second Non-Access Stratum (NAS) message indicating an update of a UE configuration,
the second NAS message indicates that the first network slice identifier is to be included in a set of rejected network slice identifiers, and
the at least one processor is configured to request the network to release the PDU session in response to the receipt of the second NAS message.

(Supplementary Note C13)

The UE according to Supplementary Note C10 or C11, wherein
the at least one processor is configured to receive from an Access and Mobility Management Function (AMF) a third Non-Access Stratum (NAS) message indicating the failure of the re-authentication and re-authorization, and the at least one processor is configured to request the network to release the PDU session in response to the receipt of the third NAS message.

(Supplementary Note C14)

A method in a User Equipment (UE), the method comprising:

in response to a failure of a re-authentication and re-authorization procedure for a first network slice identifier currently allowed to the UE, requesting a network to release a Protocol Data Unit (PDU) session associated with the first network slice identifier.

(Supplementary Note C15)

A program for causing a computer to perform a method in a User Equipment (UE), the method comprising:

in response to a failure of a re-authentication and re-authorization procedure for a first network slice identifier currently allowed to the UE, requesting a network to release a Protocol Data Unit (PDU) session associated with the first network slice identifier.

This application is based upon and claims the benefit of priority from Japanese Patent Application No. 2019-237391, filed on Dec. 26, 2019, the disclosure of which is incorporated herein in its entirety by reference.

REFERENCE SIGNS LIST

1 UE
2 AMF
3 SMF
4 AUSF
5 AN
6 UPF
7 DN
8 UDM
9 AAA-S
1903 Baseband Processor
1904 Application Processor
1906 Memory
1907 Modules
2002 Processor
2003 Memory
2004 Modules

What is claimed is:

1. A first communication apparatus comprising:
a memory; and
at least one processor coupled to the memory and configured to:
receive, from a second communication apparatus, a first message indicating a failure of authentication of a first Single-Network Slice Selection Assistance Information (S-NSSAI) for a user equipment in a re-authentication and re-authorization;
send, to a third communication apparatus, a second message requesting to release a Protocol Data Unit (PDU) session in a case where the at least one processor receives the first message; and,
send, to the UE, a Non-Access Stratum (NAS) message for instructing an update of a UE configuration after the at least one processor receives the first message,
wherein the second message includes a cause information element indicating the failure of the authentication in the re-authentication and re-authorization,
wherein the PDU session is associated with the first S-NSSAI, and
wherein the NAS message indicates that the first S-NSSAI is included in a Rejected Network Slice Selection Assistance Information (NSSAI).

2. A method in a first communication apparatus, the method comprising:
receiving, from a second communication apparatus, a first message indicating a failure of authentication of a first Single-Network Slice Selection Assistance Information (S-NSSAI) for a user equipment in a re-authentication and re-authorization; and
sending, to a third communication apparatus, a second message requesting to release a Protocol Data Unit (PDU) session in a case where the first communication apparatus receives the first message; and
sending, to the UE, a Non-Access Stratum (NAS) message for instructing an update of a UE configuration after the first communication apparatus receives the first message,
wherein the second message includes a cause information element indicating the failure of the authentication in the re-authentication and re-authorization,
wherein the PDU session is associated with the first S-NSSAI, and
wherein the NAS message indicates that the first S-NSSAI is included in a Rejected Network Slice Selection Assistance Information (NSSAI).

3. An Access and Mobility Management Function (AMF) node comprising:
a memory; and
at least one processor coupled to the memory and configured to:
trigger initiation of an authentication and authorization procedure for a particular first network slice identifier; and
if a request to establish a new session associated with the first network slice identifier is received from a User Equipment (UE) while the authentication and authorization procedure is ongoing, do at least one of: (a) suspend a session establishment procedure triggered by the request; or (b) reject the request,
wherein the at least one processor is configured to, in response to (a) suspending the session establishment procedure triggered by the request, send to the UE a Non-Access Stratum (NAS) message indicating suspension of the session establishment procedure triggered by the request.

4. The AMF node according to claim 3, wherein the at least one processor is configured to, in response to (b) rejecting the request, send to the UE a Non-Access Stratum (NAS) message indicating rejection of the request.

5. A method of a user equipment (UE), the method comprising:
communicating with an Access and Mobility Management Function (AMF); and
receiving, from the AMF, a Non-Access Stratum (NAS) message for instructing an update of a UE configuration in a re-authentication and re-authorization,
wherein the NAS message includes a cause information element indicating a failure of authentication of a first Single-Network Slice Selection Assistance Information (S-NSSAI) for the UE, and
wherein the NAS message indicates that the first S-NSSAI is included in a Rejected Network Slice Selection Assistance Information (NSSAI).

6. The method according to claim 5, further comprising:
  removing, from an Allowed NSSAI in the UE, the first S-NSSAI in a case where the first S-NSSAI is included in the Rejected NSSAI.

* * * * *